(12) United States Patent
Bisberg et al.

(10) Patent No.: US 10,796,161 B2
(45) Date of Patent: Oct. 6, 2020

(54) SYSTEM AND METHOD FOR IDENTIFYING A NUMBER OF INSECTS IN A HORTICULTURAL AREA

(71) Applicant: ILLUMITEX, INC., Austin, TX (US)

(72) Inventors: Jeffrey Elliott Bisberg, Austin, TX (US); Paul Marchau Gray, Austin, TX (US); Sirichi Bobby Srisan, Austin, TX (US); Charles Alicea, Austin, TX (US)

(73) Assignee: ILLUMITEX, INC., Austin, TX (US)

( * ) Notice: Subject to any disclaimer, the term of this patent is extended or adjusted under 35 U.S.C. 154(b) by 0 days.

(21) Appl. No.: 16/036,499

(22) Filed: Jul. 16, 2018

(65) Prior Publication Data

US 2019/0034736 A1 Jan. 31, 2019

Related U.S. Application Data

(60) Provisional application No. 62/532,792, filed on Jul. 14, 2017.

(51) Int. Cl.
*G06T 7/00* (2017.01)
*G06K 9/00* (2006.01)
(Continued)

(52) U.S. Cl.
CPC .......... *G06K 9/00771* (2013.01); *A01G 7/00* (2013.01); *A01G 22/00* (2018.02); *A01M 1/106* (2013.01);
(Continued)

(58) Field of Classification Search
CPC .... G06K 9/00771; G06K 9/38; G06K 9/6202; G06K 9/6253; G06K 9/2054; G06K 9/00369; G06K 9/4652; A01G 22/00; A01G 7/00; G06T 57/136; G06T 7/90; G06T 5/002; G06T 11/001; G06T 2207/30242; G06T 2207/20212; G06T 2207/30188;
(Continued)

(56) References Cited

U.S. PATENT DOCUMENTS

2005/0025357 A1* 2/2005 Landwehr ............. A01M 1/026
382/170
2018/0027795 A1* 2/2018 Janet ..................... A01M 1/026

OTHER PUBLICATIONS

Xla et al. "In situ detection of small-size insect pests sampled on traps using multifractal analysis". (Year: 2012).*

* cited by examiner

*Primary Examiner* — Zhihan Zhou
(74) *Attorney, Agent, or Firm* — Sprinkle IP Law Group

(57) ABSTRACT

A system comprises a digital camera to capture images of a horticultural area, a device processor and a non-transitory computer readable medium storing instructions executable by the device processor to capture, using the digital camera, a first digital image of a horticultural area containing an insect trap, isolate a portion of the first digital image using the trap detection parameters, the portion of the first digital image corresponding to the insect trap, perform automated particle detection on the portion of the first digital image according to the insect detection parameters to identify regions of pixels in the portion of the first digital image that have the insect recognition color and that pass filter criteria, determine a cardinality of insects on the first object based on a number of identified regions of pixels, store the cardinality of insects in association with the first digital image and provide the cardinality of insects for display in a graphical user interface.

20 Claims, 23 Drawing Sheets

(51) Int. Cl.
| | |
|---|---|
| *G06K 9/38* | (2006.01) |
| *G06T 7/194* | (2017.01) |
| *G06T 7/136* | (2017.01) |
| *G06T 7/90* | (2017.01) |
| *G06T 5/00* | (2006.01) |
| *G06K 9/62* | (2006.01) |
| *G06T 11/00* | (2006.01) |
| *H04N 5/232* | (2006.01) |
| *A01G 7/00* | (2006.01) |
| *H04N 5/247* | (2006.01) |
| *G06K 9/20* | (2006.01) |
| *A01M 1/14* | (2006.01) |
| *A01M 1/10* | (2006.01) |
| *A01G 22/00* | (2018.01) |
| *G06K 9/46* | (2006.01) |
| *H04N 1/00* | (2006.01) |
| *G06T 11/20* | (2006.01) |

(52) U.S. Cl.
CPC ........... *A01M 1/14* (2013.01); *G06K 9/00369* (2013.01); *G06K 9/2054* (2013.01); *G06K 9/38* (2013.01); *G06K 9/4652* (2013.01); *G06K 9/6202* (2013.01); *G06T 5/002* (2013.01); *G06T 7/136* (2017.01); *G06T 7/194* (2017.01); *G06T 7/90* (2017.01); *G06T 11/001* (2013.01); *G06T 11/203* (2013.01); *H04N 1/00* (2013.01); *H04N 5/23206* (2013.01); *H04N 5/247* (2013.01); *A01M 1/10* (2013.01); *G06K 9/6253* (2013.01); *G06T 2200/24* (2013.01); *G06T 2207/20212* (2013.01); *G06T 2207/30188* (2013.01); *G06T 2207/30232* (2013.01); *G06T 2207/30242* (2013.01)

(58) Field of Classification Search
CPC ........... G06T 2207/30232; G06T 7/194; G06T 7/136; H04N 5/23206; H04N 5/247; A01M 1/106; A01M 1/14; A01M 1/10
See application file for complete search history.

```
Premask Image  ─────1314
         │
         ▼

In [3]: # Read main mask image
mask = premask_img

# Setup SimpleBlobDetector parameters.
params4 = cv2.SimpleBlobDetector_Params()

#Thresholds. note this checks against many binary values, not just lightness
params4.minThreshold = 0         ← 1406
params4.maxThreshold = 255

# Filter by Area #2500 sqpixels
params4.filterByArea = True
params4.minArea = 2100
params4.maxArea = 2500e3

# Filter by Circularity
params4.filterByCircularity = False

# Filter by High Convexity (0.95-1.0)
params4.filterByConvexity = True
params4.minConvexity = 0.9
params4.maxConvexity = 1.0

# Filter by Inertia (0.3-1.0)
params4.filterByInertia = True
params4.minInertiaRatio = 0.3
params4.maxInertiaRatio = 1.0     ← 1408

# Set up the detector with parameters for speckles
detector2 = cv2.SimpleBlobDetector_create(params4)

#Detect small speck blobs.
flypaper = detector2.detect(mask)    ← 1410

# Draw detected blobs as red circles.
# cv2.DRAW_MATCHES_FLAGS_DRAW_RICH_KEYPOINTS ensures the size of the circle corresponds to
the size of blob
mrkr_clr = (0,0,255)
im_trap = cv2.drawKeypoints(mask, trap, np.array([]), mrkr_clr,
cv2.DRAW_MATCHES_FLAGS_DRAW_RICH_KEYPOINTS)

# Show keypoints
plt.title("premask with traps circled")
plt.imshow(im_trap);
```

FIG. 14A

1508 cv2.floodFill(image, mask, seedPoint, newVal[, loDiff[, upDiff[, flags]]])

1510

```
In [4]: im = premask_img
h,w,chn = im.shape                1511
print(np.shape(trap))

if (not trap):
    print('no trap')
else:
    seed = (np.uint(trap[0].pt[0]) , np.uint(trap[0].pt[1]))      1514 mask = np.zeros((h+2,w+2),np.uint8) #empty at first          1512 floodflags = 4
floodflags |= cv2.FLOODFILL_MASK_ONLY
floodflags |= (255 << 8)                        1516 num,im,mask,rect = cv2.floodFill(im, mask, seed, (255,0,0), (1,)*3, (1,)*3, floodflags)
plt.title('trap isolated')
plt.imshow(cv2.cvtColor(mask, cv2.COLOR_GRAY2RGB));

(1L,)
```

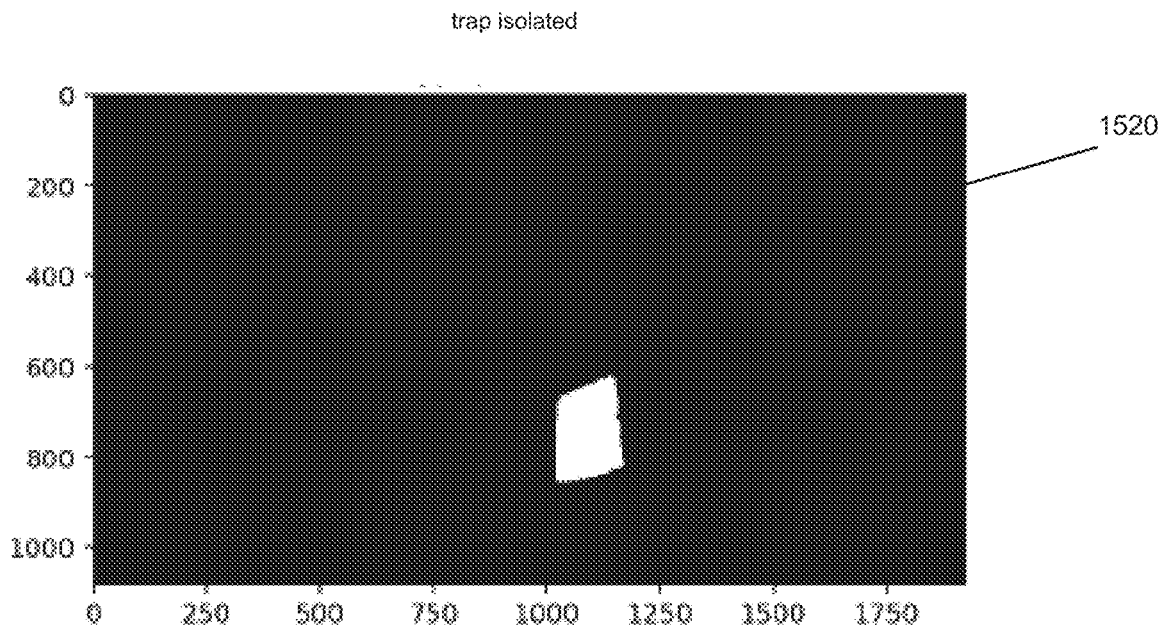

In [23]: h,w,chn = orig_img.shape

```
# Setup SimpleBlobDetector parameters.
params = cv2.SimpleBlobDetector_Params()

# Change thresholds
params.minThreshold = 25;
params.maxThreshold = 255;

# Filter by Area. Make this a function of h and w of image
params.filterByArea = True
params.minArea  = h/1000 + 3
params.maxArea  = 2*params.minArea  + 8
print(params.minArea,params.maxArea)

# Filter by Circularity
params.filterByCircularity = True
params.minCircularity = 0.5

# Filter by Convexity
params.filterByConvexity = True
params.minConvexity = 0.87

# Filter by Inertia
params.filterByInertia = True
params.minInertiaRatio = 0.1 detector = cv2.SimpleBlobDetector_create(params)

In [24]: # Detect blobs.
keypoints = detector.detect(orig_img)

1722

Draw detected blobs as red circles.
cv2.DRAW_MATCHES_FLAGS_DRAW_RICH_KEYPOINTS ensures the size of the circle corresponds to the size of blob
im_with_keypoints = cv2.drawKeypoints(original_img, keypoints, np.array([]), (0,0,0), cv2.DRAW_MATCHES_FLAGS_DRAW_RICH_KEYPOINTS)
im_with_keypoints = cv2.drawKeypoints(orig_img, keypoints, np.array([]), (0,0,255), cv2.DRAW_MATCHES_FLAGS_DRAW_OVER_OUTIMG)

Show keypoints
cv2.putText(image,"Hello World!!!", (x,y), cv2.FONT_HERSHEY_SIMPLEX, 2, 255)

plt.imshow(cv2.cvtColor(im_with_keypoints, cv2.COLOR_BGR2RGB));

print(len(keypoints) , "insect counts")

cv2.namedWindow("Keypoints", cv2.WINDOW_NORMAL)
cv2.imshow("Keypoints", im_with_keypoints)
cv2.waitKey(0)
cv2.destroyAllWindows()

(84, 'bug counts')

In [25]: cv2.imwrite('count_result.jpg',im_with_keypoints)

Out[25]: True

FIG. 17B

SYSTEM AND METHOD FOR IDENTIFYING A NUMBER OF INSECTS IN A HORTICULTURAL AREA

RELATED APPLICATIONS

This application claims priority under 35 U.S.C. § 119(e) to U.S. Provisional Application No. 62/532,792, entitled "System and Method for Identifying a Number of Insects in a Horticultural Area," filed Jul. 14, 2017, which is fully incorporated herein by reference for all purposes.

TECHNICAL FIELD

This disclosure relates generally to the field of monitoring a horticultural area. More particularly, this disclosure relates to the field of monitoring insect presence in a horticultural area. Even more particularly, this disclosure relates to embodiments for identifying a number of insects in a horticultural area.

BACKGROUND

Adverse conditions, such as water shortages, inadequate light, poor air circulation, unfavorable temperatures, poor soil quality, pathogen attack and insect infestation can detrimentally impact the health of valuable plants. Growers therefore routinely inspect valuable crops for adverse conditions and install complex automation systems, such as water, carbon dioxide, and nutrient delivery systems, to promote favorable conditions. Inspection may involve checking and measuring plant quality, soil quality, ambient air temperature, air circulation, daily light dosage, and water supply. In addition, because plant health can be greatly affected by insects, and it may be desirable to know when to treat for them without treating too often, inspection may include counting/estimating the number of insects in an area.

Ground, air, and space sensing systems may be used to facilitate inspection and (indirectly) detect biotic and abiotic stress. These sensor systems typically measure environmental factors that are assumed to affect plant health. Often these systems require data to be gathered through "spot checks" that require local insertion of the sensors to identify various conditions at a plant location. These sensor systems introduce error due to the variability in methods of data collection and the inherent error that occurs when a person collects data.

In large, dense, or expansive areas where valuable crops are grown, it is labor intensive to inspect each individual plant or designated zone. Consequently, even with automation, unfavorable conditions can persist for some time as failures may go unnoticed for days until an inspector realizes the failure point at the system or observes that plants at a location have suffered through several stages of deterioration. Moreover, inspecting for insects remains a largely manual process and it can be difficult for humans to detect the number of insects in a horticultural area before the insects cause damage to plants in that area.

SUMMARY OF THE DISCLOSURE

Embodiments disclosed herein can address the aforementioned drawbacks and provide additional technical solutions and benefits. A system and method for identifying the number of insects in a horticultural area is disclosed. Such a system and method may be used as part of a greater system in which the health of plants in a horticultural area is monitored and the plants are treated in response to findings from the monitoring. For example, embodiments disclosed herein provide a new system, method, and computer program product for identifying a number of insects in a horticultural area and/or on an insect trap. The number of insects may be used to determine whether the plants in the horticultural area need to be treated for insects. In some cases, the system may implement rules to notify a user of the desirability to treat for insects or interact with an automatic treatment system to treat for insects. For example, the number of insects may be below a certain threshold where the insects do not negatively affect the plants and, as such, it may be determined that no insect treatment is needed. In other cases, the number of insects may be above the threshold. In such cases, it may be determined that insect treatment is needed. The threshold may be determined based on a variety of factors. For example, the threshold may be determined based on the sensitivity of the plants to the insects, the cost of the repellent, and/or the amount of time left until harvesting.

One embodiment of a system comprises a digital camera positioned to capture images of an insect trap in a horticultural area. A data store storing trap detection parameters selected to identify pixels corresponding to insect traps and particle detection parameters selected to detect pixels corresponding to insects, the insect detection parameters including an insect recognition color and filter criteria. The system further comprises a device processor and a non-transitory computer readable medium storing instructions executable by the device processor. According to one embodiment, the instructions are executable to capture a first digital image of a horticultural area using the digital camera, isolate a portion of the first digital image using the trap detection parameters, the portion of the first digital image corresponding to the insect trap, perform automated particle detection on the portion of the first digital image according to the insect detection parameters to identify regions of pixels in the portion of the first digital image that have the insect recognition color and that pass the filter criteria, determine a cardinality of insects on the first object based on a number of identified regions of pixels, store the cardinality of insects in association with the first digital image and provide the cardinality of insects for display in a graphical user interface. According to one embodiment, the insect detection parameters are based on a user selected insect.

According to one embodiment, isolating the portion of the first digital image corresponding to the insect trap can include converting the first digital image to a specified color space (e.g., LAB color space or other color space) to create a converted digital image, performing a conditioning on the converted digital image to produce a conditioned digital image in which pixels representing the insect trap are further separated from pixels representing a background, perform an object detection to detect the insect trap in the conditioned digital image, performing a first isolating operation on the conditioned digital image to produce an image mask and perform a second isolating operation on the first digital image using the image mask to isolate the portion of the first digital image.

The conditioning can comprise a number of condition steps, such as performing one or more threshold passes map pixels above a threshold to a value of 255 and pixels below the threshold to 0 or vice versa. According to one embodiment, the conditioning may include performing a first overlay operation on the converted digital image to produce a first overlaid image, performing an analysis on the first overlaid image to determine a maximal difference among pixel color values for the first overlaid image, performing a first threshold pass on the overlaid image to produce a first thresholding result image, performing a blur operation to blur clustered regions in the first thresholding result image to produce a blurring result image and performing a second threshold pass on the blurring result image to produce a second thresholding result image. The first and second threshold passes may apply thresholds that are dependent on the maximal difference among pixel color values for the first overlaid image. According to one embodiment, the conditioned image in which the insect trap is detected is the second thresholding result image.

In one embodiment, performing the analysis on the first overlaid image to determine the maximal difference among pixel color values for the first overlaid image comprises determining a row-specific difference between maximal and minimal values of pixels in respective rows of pixels in the first overlaid image and selecting a greatest row-specific difference as the maximal difference among pixel color values for the first overlaid image.

Performing the first overlay operation on the transformed image may comprise determining, for each pixel in the converted image, an absolute value of a difference between two channels of the specified color space.

Performing particle detection on the portion of the first digital image according to the insect detection parameters to identify regions of pixels in the portion of the first digital image that pass the filter criteria comprises converting the portion of the first digital image to an insect detection color space. In one embodiment, the insect detection color space is grayscale.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure encompasses all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 14A illustrates an example technique for blob detection for isolating an insect trap in an image according to an embodiment and FIG. 14B illustrates an image result of blob detection.

FIG. 15 illustrates an example floodfill technique according to an embodiment.

FIGS. 17A and 17B illustrate an example technique for blob detection for detecting insect blobs in an image according to an embodiment.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide a computer-implemented monitoring system to monitor the number of insects in a horticultural area. Insect traps may are placed in various positions in the horticultural area and the computer-implemented monitoring system captures images of the insect traps. The computer-implemented monitoring system processes the images to transform the images into an insect count. Based on the number of insects determined, the computer-implemented monitoring system can take a variety of actions.

Figure 1:
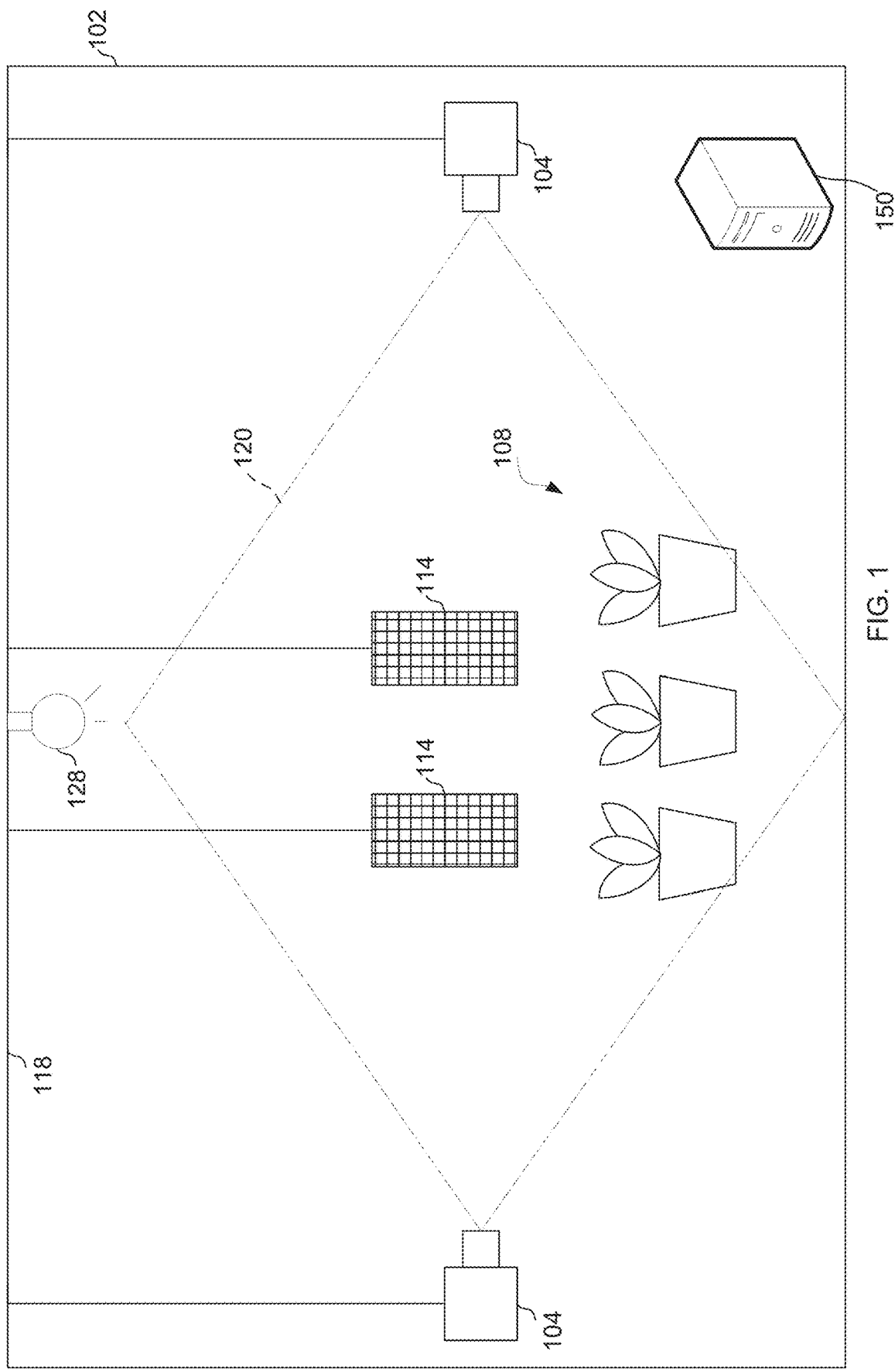
FIG. 1 depicts a horticultural area according to an embodiment.

FIG. 1 is a diagrammatic representation of a horticultural area 102. Horticultural area 102 can be any type of horticultural area, such as a greenhouse, a grow room, an outdoor garden or agricultural area, or other horticultural area, and can include any number of plants 108 of the same or varying types. In some embodiments, the plants 108 grow in pots or troughs with a single plant per pot/trough or multiple plants per pot/trough.

The plants 108 are illuminated by one or more light sources. In an outdoor agricultural application, for example, the light source may be the sun. In other applications, the light source may be a controlled light source such as an LED light array or other light source. FIG. 1 shows horticultural area 102 as a grow room having light source 128 disposed on ceiling 118 to illuminate plants in horticultural area 102. The light sources may have known color mixes that can be used to aid in analyzing images for certain colors/reflections, as discussed below. According to one embodiment, the light source 128 may comprise one or more visible spectrum light sources.

To collect a representative number of insects within the horticultural area 102, insect traps 114 are disposed within the horticultural area 102. The size and number of insect traps may be selected based upon a variety of factors, such as the size of the horticultural area 102, the size and variety of plants 108 and/or the type of insects of interest.

As would be appreciated in the art, an insect trap 114 may have surfaces of a color selected to attract insects. For example, in some embodiments, insect traps 114 may include yellow to attract whiteflies, blue to attract thrips or other color. The color of insect traps 114 may be selected to be unique with field of vision of cameras 104 under the spectrum of light provided by light source 128. Further, the surfaces of an insect trap 114 may be coated in an adhesive so that insects stick to the insect trap 114. An insect trap may include a visible grid or other features to aid in estimating the number of insects per unit area of the trap. As one example, the insect traps 114 may include sticky insect traps, such as Dual-Sided Yellow Sticky Traps for Flying Plant Insect Like Fungus Gnats, Aphids, Whiteflies, Leafminers produced by TRAPRO or Insect Sticky Cards produced by Bioworks Inc.

The insect traps 114 can be mounted to walls, the ceiling, stands or other structures. The positioning of the insect traps 114 may be selected based on a variety of factors. For example, the insect traps 114 may be positioned near one or more plants 108 and in the field of view of a camera 104. The insect traps 114 may also be positioned based on the number and spacing of plants 108. According to one embodiment, 40 insect traps may be provided per hectare inside the horticultural area 102.

One or more cameras 104 are located in a position such that the camera can capture an image of objects, such as insect traps 114, in the horticultural area 102. The camera(s) can be mounted to a wall, ceiling, or other structure. For example, in some embodiments, the camera(s) can be mounted to light fixtures of light source 128, a tripod or other item. In yet other embodiments, the camera(s) can be mounted to a drone. The number of cameras may be selected based on a number of factors. For example, the number of cameras may be selected based on the range of the camera(s), the resolution of the camera(s), the size of the horticultural area, the number of plants included in the horticultural area, and/or the number of insect traps in the horticultural area.

The type of camera(s) used may be selected based on a number of factors. For example, the type of camera(s) may be selected based on the range of the camera(s), the resolution of the camera(s), the automated abilities of the camera(s), the mounting capabilities of the camera(s), and/or the size of the camera(s). For example, in some embodiments, the camera(s) has a range of 10 ft.×10 ft. In another example, the camera(s) has a range of 20 ft.×20 ft. In some embodiments, the camera may be a pan-tilt-zoom (PTZ) camera. Such a camera is capable of capturing a large range of the horticultural area with few adjustments. Additionally, such a camera can also allow for "on-demand" remote positioning and adjustment of image views. Though not necessary, a high resolution camera yields higher quality of images than a low resolution camera. Higher quality images can result in higher quality analysis. Quality of images/data is evaluated in terms of clarity and resolution, and it is a function of camera pixel resolution and focal length.

Aside from pixel resolution, lens stack and image sensor quality can affect the camera's ability to capture a high-quality image data. An example of a high resolution camera that would work in this scenario is a Hikvision DS-2DF88361V-AELW, which has a 4K 8 megapixel (4096×2160) resolution, as well as smart tracking and smart recording. Another example of a high resolution camera that would work in this scenario is a Hikvision DS-2DF82361-AEL, which has a 1920×1080 resolution, as well as smart tracking and smart recording. In some embodiments, the cameras 112 may include an IR light sources mounted on the camera.

FIG. 1 shows an embodiment in which a first camera 104 is positioned such that it can capture an image of insect traps 114 and plants 108 from a first side of the horticultural area and a second camera 104 is positioned such that it can capture an image of insect traps 114 and plants 108 from a second side of the horticultural area. Dotted lines 120 show the field of view that can be captured by cameras 104. In some embodiments, a camera 104 may each be positioned near an insect trap 114 such that the camera 104 is focused on a single insect trap 114 and possibly the area immediately surrounding the insect trap 114. This type of positioning may be particularly useful when the camera 104 is a low resolution camera and/or has limited range. In other embodiments, a camera may capture multiple insect traps in a single image. The camera(s) 104 may be positioned where the camera(s) 104 together capture a view of all the plants 108 in horticultural area 102.

A computer system 150, which may be located in or near horticultural area 102 or remote from horticultural area 102, may receive digital images from cameras 104 and analyze the digital images from the cameras 104 to determine an insect count. As discussed below, the insect count may be based, at least in part, on identifying objects of at least a minimum size in the insect traps 114 as shown in the images. As such, a camera's resolution, viewing angle, position and other factors may be selected so that insects of the smallest insect type to be counted by the system can be distinguished in images of the insect traps taken by the camera.

Figure 2:
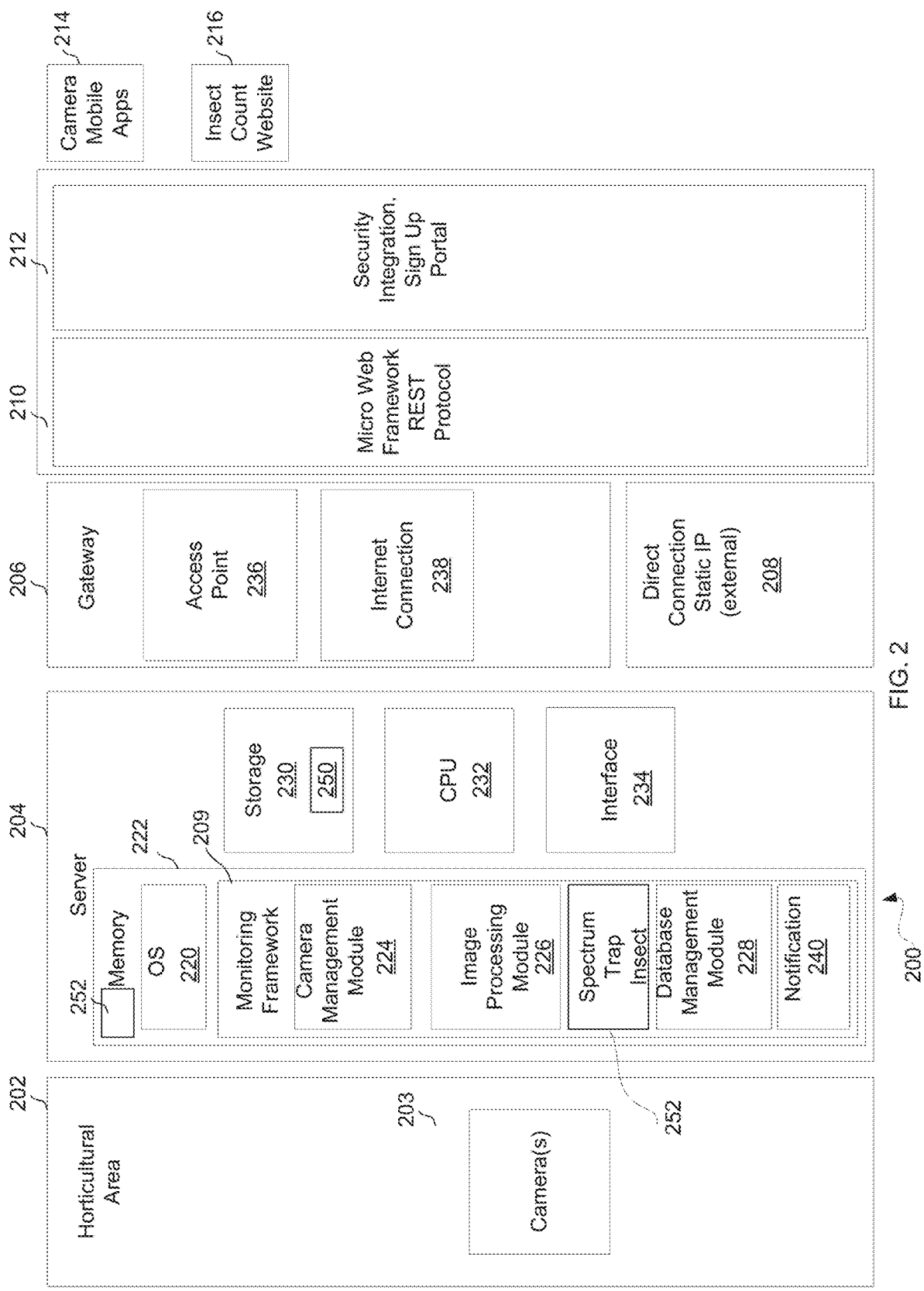
FIG. 2 depicts a block diagram illustrating an embodiment of a plant monitoring system.

FIG. 2 depicts a block diagram illustrating one embodiment of a plant monitoring system 200. In the example illustrated, plant monitoring system 200 is configured to monitor horticultural area 202 and includes camera(s) 203 and a server 204 configured to process images captured by the camera(s). Camera(s) 203 are examples of camera(s) 104 and server 204 is an example of a computer system 150, which in some embodiments may comprise a microcomputer. The camera(s) may be coupled to the server by a wireless network, wired network, bus (e.g., USB or other bus) or combination thereof. According to one embodiment, camera(s) communicate with server 204 over a local area network (LAN).

In the embodiment illustrated, server 204 includes one or more of a central processing unit (CPU) 232, a network interface 234 to connect to and interface with a wired or wireless network, memory 222, storage 230 and other computer components. Memory 222 can comprise RAM, ROM, magnetic storage and/or other computer readable memory and can store various software programs including, for example, an operating system (OS) 220 and code for a plant monitoring framework 209. The OS 220 may include any suitable type of operating system. In one embodiment, the operating system may include open-source software, such as Linux. The plant monitoring framework 209 may include a REST interface 210 (or other interface) for a microservice framework and a security portal 212. The interface 210 can be provided to allow client computing devices to access services to control cameras 203, retrieve data from server 204 or configure server 204 using, for example, a mobile application 214 or a web site 216.

Figure 3:
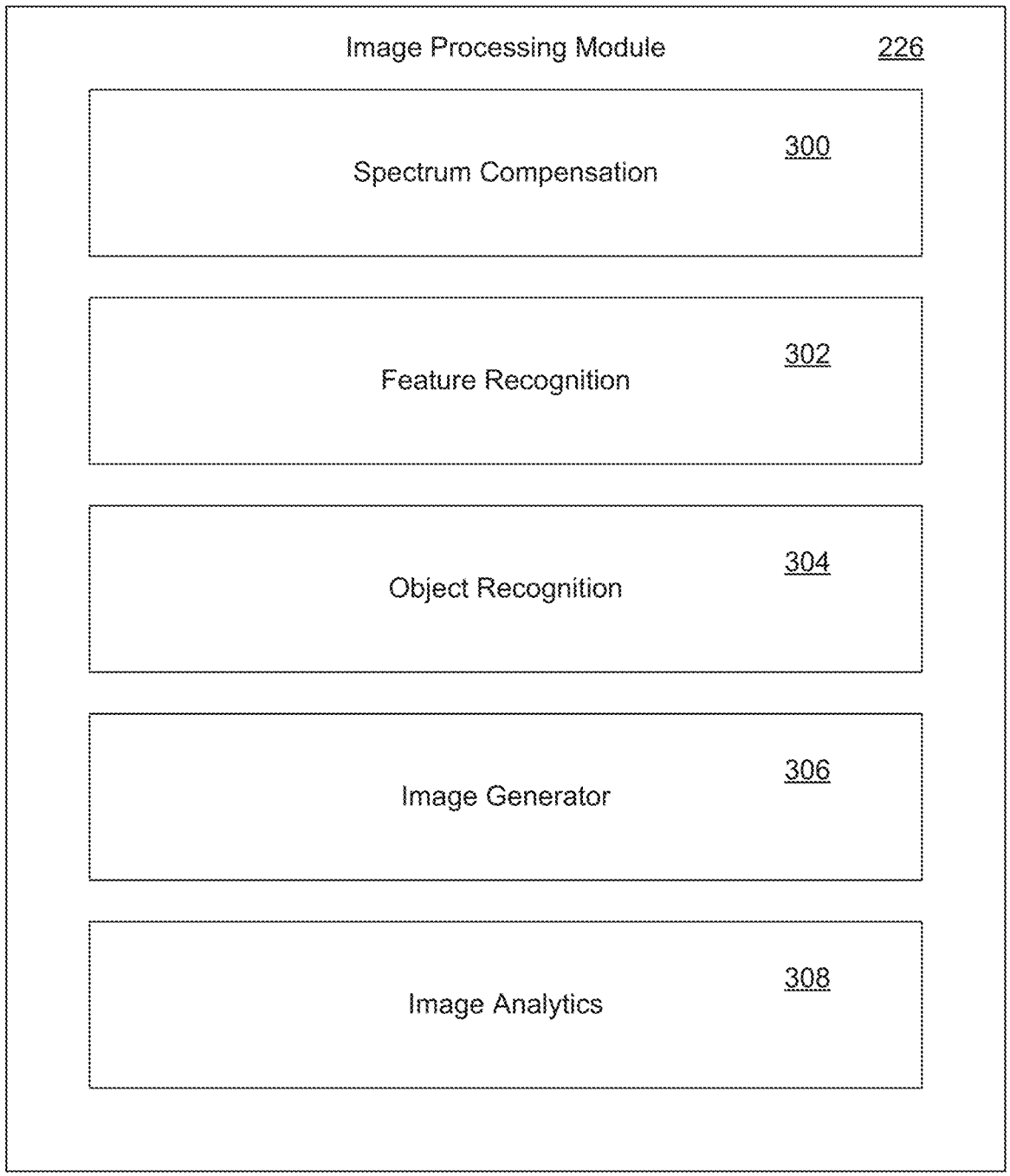
FIG. 3 depicts a block diagram illustrating an embodiment of the image processing code shown in FIG. 2.

Memory 222 may further store code for a camera management module 224, image processing module 226 and database management module 228. The camera management module 224 controls the movement, zooming, and image capturing of the camera(s) 203. The image processing module 226 processes images in the manner discussed in more detail below. In one embodiment, as shown in FIG. 3, image processing module 226 includes spectrum compensation 300, feature recognition module 302, object recognition module 304, image generator module 306, and image analytics module 308. Memory 222 may also provide a data store to store image processing parameters 252. Image processing parameters 252 may be stored as part of image processing module 226 or in a location accessible by image processing module 226. Image processing parameters 252 may include spectrum compensation parameters, trap detection parameters selected to detect insect traps in a horticultural area or insect detection parameters selected to detect insects of an insect type. Image processing parameters may include multiple sets of spectrum compensation parameters, trap detection parameters or insect detection parameters so that image processing module 226 can be configured to operate with multiple spectrums or to detect multiple types of insect traps or insects. The spectrum compensation parameters, trap detection parameters or insect detection parameters applied in a particular instance may be based on a user selection of spectrum, trap or insect to be detected. In other cases, spectrum compensation, trap detection or insect detection parameters may be hard coded. In yet other embodiments, one or more parameters sets may be automatically detected.

The database management module 228 may manage the images in an image database 250 on storage 230. According to one embodiment, storage 230 may comprise high capacity storage, such as a Redundant Array of Independent Disks (RAID) array of magnetic disks or other persistent computer readable memory. Although FIG. 2 shows modules on a single server 204, in some embodiments, the modules may be located on different devices. For example, image processing module 226 may be hosted on one server (or may be distributed across multiple devices), while database management module 228 may be hosted on a different server (or may be distributed across multiple devices).

Plant monitoring system 200 may further include notification modules 240 configured to analyze data in storage 230 and automatically send notifications to users according to notification rules. The notification modules 240 can be configured, for example, to generate notifications when certain metrics data is detected in data store 230. For example, a notification module may watch for an indication that a certain number of insects have been detecting in a horticultural area or region of a horticultural area, and in response to detecting data meeting the criteria, email or SMS a user associated with the horticultural area to alert the user of the insect count. In other embodiments, the metrics data may be surfaced via web site 216 (e.g., in a user portal).

Server 204 may connect to a wireless gateway 206 via a wired or wireless network. Gateway 206 may provide a wireless access point 236 such that server 204 may communicate with a plurality of sensors or cameras via the wireless access point 236 and or connect to the Internet through gateway 206 and a WiFi network. Gateway 206 may also provide a cellular modem so that server 204 can connect to the internet when a WiFi network or wired network is not available. According to one embodiment, gateway 206 may be a SIERRA WIRELESS GX450 gateway or other gateway. Server 204 Server 204 may connect to an Internet gateway 206 via a wired or wireless connection. Gateway can provide a wireless access point 236 such that server 204 may communicate with a plurality of sensors or cameras via the wireless access point 236 and connect to the Internet through gateway 206 and a WiFi network. Gateway 206 may also provide a cellular modem 238 so that server 204 can connect to the Internet when a WiFi network or wired network is not available. Server 204 can connect to a WAN via a direct connection IP device 208, such as a modem or Ethernet router assigned an IP address (in some embodiments, a static IP address).

In operation, cameras 203 may capture images of the horticultural area. Each image may be stored in image store 250 with accompanying metadata, such as a time stamp and an indication of the camera that captured the image or the portion of the horticultural area imaged. Thus, multiple images taken at the same time or within a particular time window may be considered to represent the state of horticultural area at a given time. Image processing module 226 can process the images to determine a number of insects on each insect trap in the horticultural area. In some cases, image processing module may store additional images, such as cropped images of a trap in association with the original image in image store 250. Image processing module 226 can further store an insect count in association with each image from which a count was determined. The counts from various images captured at a particular time or in a particular time window can be analyzed to determine for that time, a total insect count for the horticultural area, an insect count per unit area or volume or other insect count metrics. The insect count metrics may be stored in association with one or more images or a time. A notification module 240 can be configured to automatically send notifications to users according to notification rules. The notification modules 240 can be configured, for example, to generate notifications when certain metrics data is detected in data store 230.

Figure 4A:
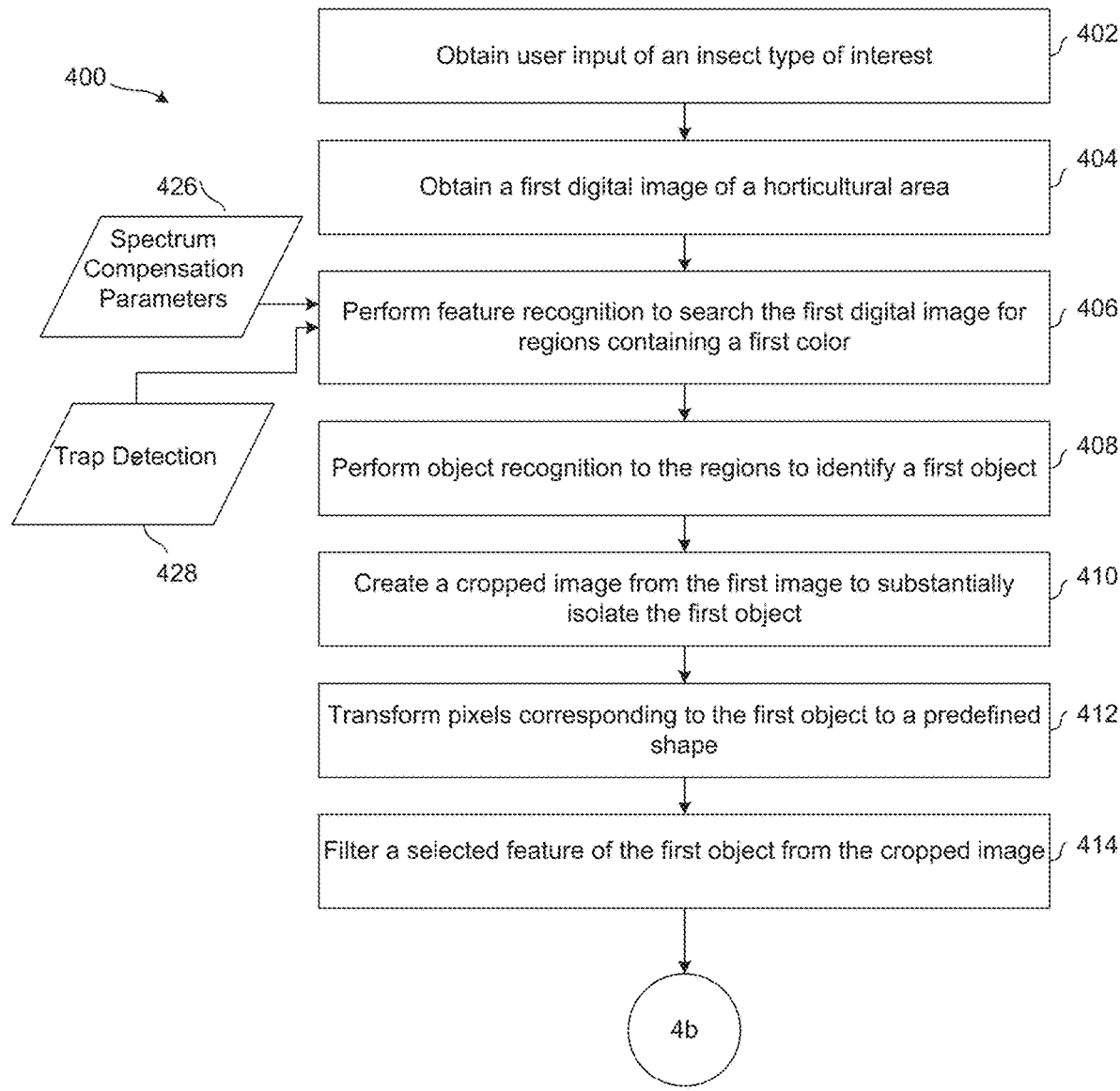
FIGS. 4A and 4B depict a flow chart illustrating an example of a method of identifying a number of insects in a horticultural area according to an embodiment.
Figure 4B:
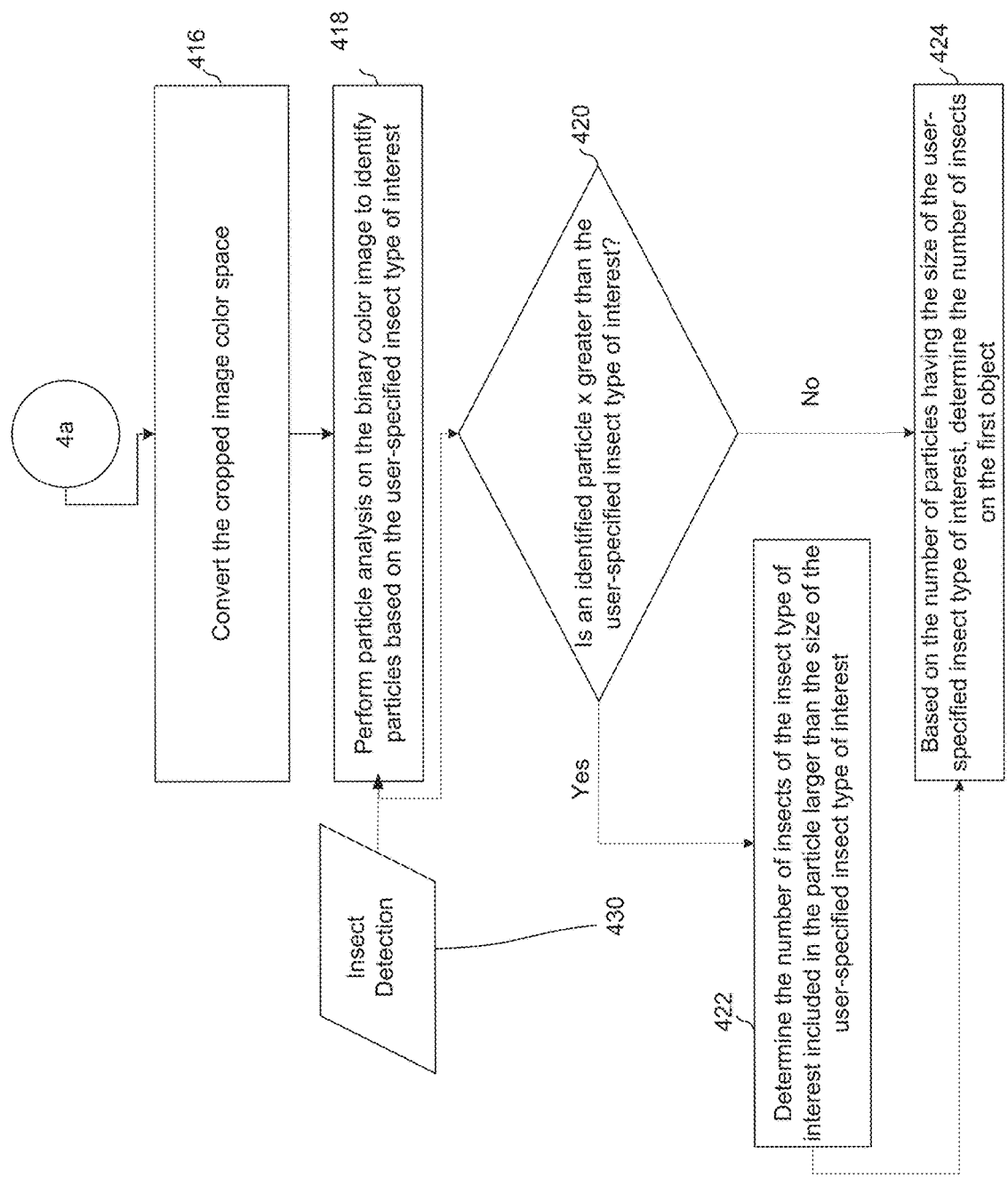
Figure 9A:
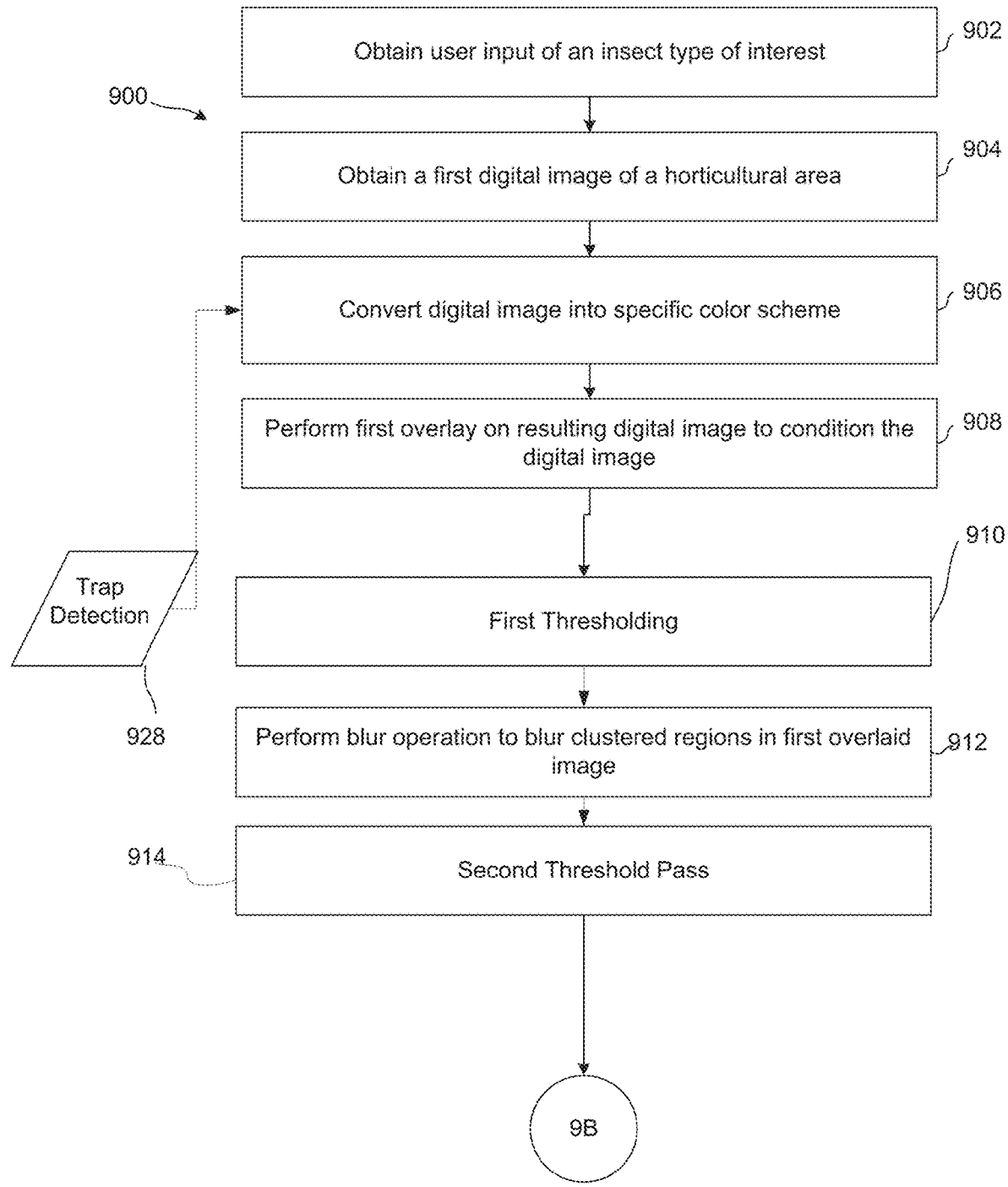
FIGS. 9A and 9B depict a flow chart illustrating an example of a method of identifying a number of insects in a horticultural area according to an embodiment.
Figure 9B:
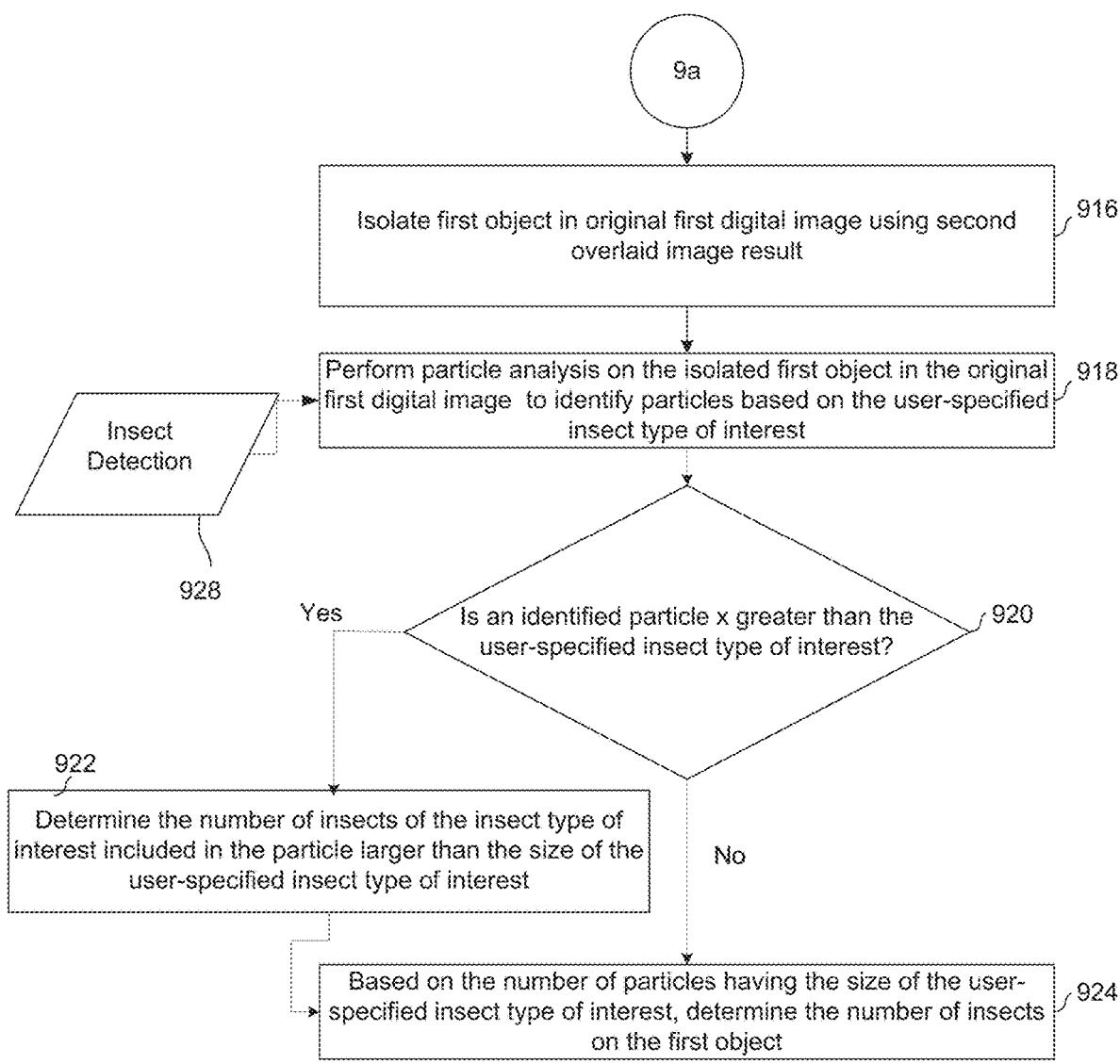

FIG. 3 is a block diagram of one embodiment of image processing module 226. One embodiment of a method that may be implemented by image processing module 226 is illustrated in FIG. 4A and FIG. 4B. FIGS. 9A and 9B illustrate another embodiment of a method that may be implemented by image processing module 226. For the sake of explanation, various examples are discussed below incorporating functions of the Open Source Computer Vision Library (OpenCV). One of skill in the art will appreciate from the teachings, herein, that OpenCV is simply one example of vision code and various steps may be implemented using other code libraries, including proprietary code libraries.

With reference to FIG. 4A and FIG. 4B, at step 402, user input of an insect type of interest is obtained. The user input may be obtained a number of different ways. For example, the user may select an insect type of interest from a variety of insect types using a mobile app 214 or web site 216 that communicates with the server 204 (e.g., via REST interface 210). In another example, the insect type of interest may be built into the system that is selected to perform the method. In such an example, different systems may be available to apply specific situations in which certain insect types are of interest to the user.

The method of identifying a number of insects in a horticultural area includes obtaining a first digital image of horticultural area (step 404). Image processing module 226 may obtain the image from a camera 203 or from the image database.

Figure 5:
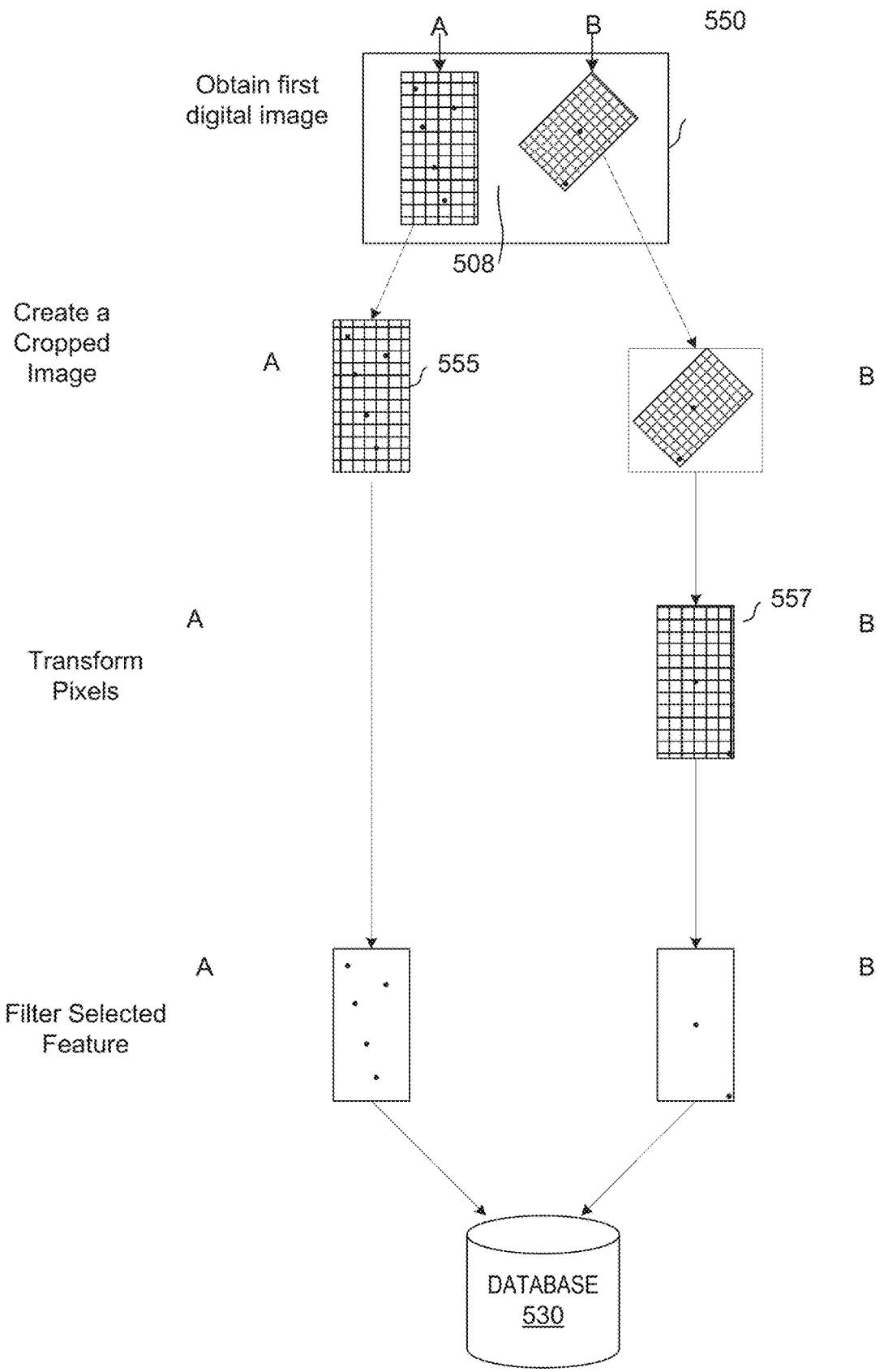
FIG. 5 illustrates the performance of a few steps from an embodiment of the disclosed method.

A digital image may include one or more objects of interest. Turning briefly to FIG. 5, which illustrates one embodiment of a digital image being processed, digital image 550 includes first object A (e.g., a first insect trap) and a second object B (e.g., a second insect trap) against a background 508 of plants or other items in a horticultural area. As discussed in more detail below, the insect traps are the objects of interest in the digital images 550 because the insect traps contain the insects that are to be analyzed.

Feature recognition module 302, at step 406, may perform feature recognition to search the first digital image 550 for regions corresponding to predefined features. In one embodiment, the features may be special features printed on insect traps 114 that feature recognition module 302 is configured to locate. Such special features may include unique symbols proximate to the corners, center or other portion of an insect trap 114. Thus, for example, trap detection parameters 428 can include a specification of the printed features to detect.

In another embodiment, feature recognition comprises color filtering to identify regions of the first digital image 550 containing a first color. The first color may be set as a range of colors (e.g., in trap detection parameters 428) corresponding to the color of the insect traps 114 being analyzed. For example, if the insect traps 114 are yellow under natural light, the color recognition may be performed to search the first digital image for regions containing a range of colors that correspond to yellow. In another example in which the insect traps 114 are blue, the color recognition may be performed to search the first digital image 550 for regions containing a range of colors corresponding to blue. The color filtering function can return a color filtered mask with coordinates of pixels containing the specified color (e.g., yellow compensated for the spectrum). By searching the first digital image 550 for regions containing a first color, the insect traps 114 may be located by color.

For convenience, a user may be able to select the color searched for based on how the insect traps 114 appear under natural light (e.g., yellow). However, natural lighting may not be used in all horticultural areas and insect traps 114 that appear as one color under sunlight may appear as another color under the spectrum applied (e.g., by light source 128). For example, an insect trap 114 that is yellow under sunlight may appear as purple (or other color) under other spectra. In some embodiments, spectrum compensation 300 may apply spectrum compensation parameters 426 to the selected color to be searched for based on the spectrum of light being used. For example, if the insect traps 114 are yellow under sunlight, but purple under the spectrum applied, spectrum compensation 300 may apply spectrum compensation parameters 426 to map the color selected from yellow to a range of purple colors. In some embodiments, the light source (e.g., light source 128) may provide dynamic spectrum changes. Spectrum compensation 300 may apply dynamically changing spectrum compensation parameters 426 to compensate for the spectrum applied at any given time.

A configuration interface may be provided to allow a user to configure the color to be searched for and the spectrum. If the spectrum is provided, image processing module 226 can be configured to map the input spectrum and color to the spectrum compensation parameters. In other embodiments, a user may input the spectrum compensation parameters. In other embodiments, the feature detection applied may not require spectrum compensation.

According to one embodiment, step 406 may be implemented using the functions of OpenCV or other image processing code. For example, in one embodiment the cv2.cvtColor( ) and cv2.inRange( ) functions can be used to produce a color filtered mask that includes values identifying filter coordinates of pixels containing the specified color—that is pixels in the color range specified in the trap detection parameters 428. More particularly, the cv2.cvtColor( ) function may be used to convert image to a preferred color space in which it is easier to identify the color of interest and cv2.inRange( ) may be used to produce the color filtered mask that includes values identifying coordinates of pixels containing the specified color.

In step 408, object recognition module 304 of image processing module 226 identifies objects of interest (e.g., insect traps) in the first image 550. In some embodiments, such as the embodiment shown in FIG. 4A, the regions in step 408 may include the regions identified as having the first color or otherwise corresponding to a located feature in step 406. For example, once regions having the first color have been found, object recognition may be performed to these regions to identify a first object. In such an example, a shape of the first object may be known (e.g., specified in the trap detection parameters 428), and this shape may be used to identify the first object. In a case where two or more points of the object have been located, the rest of the points of the object may be determined based on the known shape of the object. For example, if the shape is a rectangle of a known size and two corners of the rectangle are found, the two found corners of the rectangle may be used to determine the location of the remaining two corners of the rectangle. According to one embodiment, an object (e.g., an insect trap) is identified based on the coordinate min and max combinations of the pixels returned from the color filtered mask. In other embodiment, an object may detected using blob detection or other techniques.

The steps may be performed in different orders than in the example discussed above. For example, a shape of the first object may be known, and this shape may be used to identify the first object. The first object may be found by searching the first image 550 for the known shape. Then, after the first object is found, the first object may be searched for the first color to verify that the first object has accurately been found. Moreover, more than one object may be recognized in step 408, and, therefore, may be analyzed for determining the number of insects on the objects. For example, the first digital image 550 can include object A and object B representing two insect traps.

At step 410, a cropped image is created from the first image 550 to substantially isolate the first object. In some embodiments, this step may be accomplished by image generator 306 of image processing module 226. More particularly, the first image 550 is cropped down to the first color found during step 406 and the first object identified in step 408, thus leaving only the first object in the cropped image. By isolating insect traps 114, items on the traps may be further analyzed to determine what those items are, and/or how many items (e.g., insects) are on the traps, instead of potentially analyzing items that are in an image, but not necessarily on an insect trap 114. In other embodiments, the image is not cropped.

In some embodiments, step 410 may be performed after step 406, such that the first image is cropped to show only regions containing a first color with a minimum of excess image. In some embodiments, multiple cropped images may result from step 410. For example, in FIG. 5 digital image 550 is cropped down to create a first cropped image 555 of first object A and a second cropped image 557 of second object B.

At step 412, the pixels corresponding to the first object may be transformed to a predefined orientation and size. Examples of the predefined shape include typical shapes of insect traps, such as rectangles and circles. According to one embodiment, image generator module 306 implements the functions of OpenCV or other image processing code to crop the first image to a rectangle containing a single object of interest (e.g., based on the object(s) identified in step 408). In addition, if the object of interest is skewed—for example, the upper and lower edges of the object of interest is not horizontally aligned and the side edges are not vertically aligned—image generator module can deskew the object of interest. For a rectangular object of interest, a bounding box, center of rotation (center of bounding box) and skew angle of the object of interest can be determined based on the edges of the object of interest. The object of interest can be rotated using the OpenCV rotation matrix and warpAffine function. The object of interest may also be scaled to a desired size. An example of step 412 being performed is shown in FIG. 5 in which the pixels corresponding to the second object B are transformed to a predefined shape of a rectangle with a preferred orientation and size.

At step 414, a selected feature of the first object is filtered from the cropped image. In some embodiments, this step may be accomplished by image generator 306 or image analytics module 308 of image processing module 226. The feature may include, for example, a grid, a brand logo, direction for use or other feature that appears in an image being analyzed. An example of step 414 being performed is shown in FIG. 5. In this example, the embodiment shown in FIG. 5 includes gridlines forming a pattern on a surface of first object A and second object B. These gridlines are the selected feature that is filtered from the cropped image. Filtering of the selected feature may make it easier to see the difference between the first object and the particles analyzed in other steps discussed below.

At step 416, image generator 306 coverts a cropped image into an insect recognition color space in which insects may be easier to distinguish from the trap. According to one embodiment, the cropped image is converted to a color space constrained by hue. In a particular example, the cropped image is converted to a grayscale image. For example, if the first object is an insect trap having a yellow surface and the insects of interest are brown, the yellow portion of the insect trap will be transformed to a gray and the brown insects will be transformed to a binary color, such as black, or a darker shade of gray. This transformation can make it easier to distinguish between the trap and the particles.

At step 418, image analytics module performs a particle detection on a source image, such as a converted, cropped image in the desired color space to identify particles in the image. The particle analysis may be configured via insect detection parameters 430 to identify particles based on the user-specified insect type of interest and may be performed a number of different ways. In the case where the pixels corresponding to insects were transformed to a dark range of grays during step 416, the particle analysis may include performing color recognition to search the source image for regions of pixels in an insect recognition color (a particular range of values) that pass filter criteria (e.g., greater than or equal to a predefined size, have particular shape characteristics or other features corresponding to the selected insect) specified by the insect detection parameters 430.

The method of identifying a number of insects in a horticultural area may include applying rules to determine whether one or more particles are multiple insects clumped together. In the example shown in FIG. 4B, at 420, a decision is made as to whether there is a relatively large particle identified (e.g., whether a particle is greater than a threshold size that is greater than the defined insect size). Accordingly, in an embodiment in which a white fly is the insect type of interest, a decision is made as to whether a size of an identified particle is x times greater than the predefined size of a white fly. Similarly, in an embodiment in which a thrip is the insect type of interest, a decision is made as to whether a size of the identified particle is x times greater than the predefined size of a thrip.

In response to deciding that an identified particle is a threshold size larger than the defined size of the user-specified insect type of interest, the particle can be broken down into a number of insects (step 422). This determination can be accomplished, for example, by dividing the size (e.g., surface area) of the particle determined to be larger than the size (e.g., surface area) of the user-specified insect type of interest by the size of the user-specified insect type of interest (e.g., particle size/insect size). Once the number of insects in the particle that is larger than the size of the user-specified insect type of interest is known, this number can be added to the number of insects determined in step 424. If a particle size is not greater than a threshold size as determined at step 420, the particle can be considered a single insect. The identified particle can be added to the number of the insects on the first object.

Accordingly, at 424, the number of insects on the first object can include adding up the number of identified particles considered to be a single insect, as well as adding in the numbers of insects determined in step 422. The number of insects determined to be included on the first object may be used to estimate the number of insects in the horticultural area 102.

If no particles are identified when the particle analysis is performed on the image, then the next step may include returning to the step of obtaining a first digital image of the horticultural area 102. This way, one or more of steps 402, 404, 406, 408, 410, 412, 414, and 416 may be repeated to determine whether any insects have shown up on the insect trap. Even if insects are detected on the insect traps, the steps of the method may be repeated at certain predetermined intervals to monitor any increase in insect presence.

In some embodiments, steps 414-422 may be accomplished by image analytics module 308 of image processing module 226. According to an example embodiment, image analytics module 308 may utilize a blob detection algorithm for particle analysis. Even more particularly, in an example embodiment, image analytics module 308 utilizes the SimpleBlobDetector of the OpenCV framework of Python-based code. The blob detection algorithm is controlled by insect detection parameters 430 to filter out blob characteristics.

According to one embodiment, a source image (e.g., a cropped image of an insect trap) is converted to grayscale to aid with thresholding. The blob detection method may proceed as follows in one embodiment:

Thresholding: The source image is converted to several binary images by thresholding. The image is analyzed to identify pixels within thresholds starting at minThreshold. The thresholding creates several binary images from the source images based on the thresholding parameters. According to one embodiment, the thresholding values may be values in a range (e.g., 0-255, where 0=black and 255=white). When a threshold of, say 5, is applied, a binary image is created in which pixels in the input with values from 5 to maxThreshold are set to white and the other pixels are set to black. The threshold is incremented by thresholdStep until maxThreshold. So the first threshold is minThreshold, the second is minThreshold+thresholdStep, the third is minThreshold+2×thresholdStep, and so on to create a set of binary images.

The thresholds may be selected based on the insect of interest, trap and other factors. For example, if it is known that the trap will be a light gray in grayscale and the insect of interest will be a dark gray, the minThreshold can be set such that pixels that are darker than the trap, but below the maxThreshold, are set to white. The min and max thresholds can be determined for various traps, insects or other factors to create a series of binary images.

Grouping: In each binary image, connected white pixels are grouped together and considered a blob. In this context, "connected white pixels" are white pixels that are adjacent to each other in an image under analysis.

Merging: The centers of the binary blobs in the binary images are computed, and blobs located closer than minDistBetweenBlobs are merged. For example, centroids of the binary blobs may be determined, and the distances between respective centroids may be computed to compare that value with a predetermined value of minDistBetweenBlobs. Pairs of blobs within minDistBetweenBlobs of each other may then be merged.

Center & Radius Calculation: The centers and radii of the new merged blobs are computed and returned. For example, the centers may be determined as the respective centroid of each respective new merged blob. For example, a radius of a new merged blob may be determined as half the diameter, which may be determined as the maximal distance between any two points in the new merged blob.

Filtering by Color, Size and Shape. The datatype is a number range for each of size and shape (i.e. it can be an integer 0-255).

By Color: this filter compares the intensity of a binary image at the center of a blob to blobColor. If they differ, the blob is filtered out. Use blobColor=0 to extract dark blobs and blobColor=255 to extract light blobs.

By Size: Blobs are filtered based on size with appropriate values for minArea and maxArea. E.g. setting desired pixel range.

By Shape: Shape has three different parameters: Circularity, Convexity and Inertia.

Circularity: measures how close to a circle the blob is. For example, a regular hexagon has higher circularity than, say, a square. In an example embodiment, circularity is defined as ($\frac{4*\pi*Area}{perimeter*perimeter}$). One skilled in the art of computing will appreciate that circularity may be determined by other computations, without departing from the spirit of the present disclosure.

Convexity: The outward curvature. In an example embodiment, convexity is defined as the (Area of the Blob/ Area of its convex hull). In an example embodiment, convex hull of a shape is defined as the tightest convex shape that completely encloses the shape.

Inertia: The inertia parameter is another parameter for blob detect function. In an example embodiment, the inertia parameter takes on a value from 0.00 to 1.00 and characterizes how elongated a blob is. Effectively, the higher the value of inertia for a blob, the more round it is. Blobs that are more elongated have lower values.

One or more of the color, size, shape blob filter parameters may be based on the insect type selected. For example, thrips may map to one set of color, size and shape parameters, whereas white flies map to another set of color, size and/or shape parameters. In some cases, the thresholding step may be sufficient to account for color. Each blob remaining after blob filtering may be counted as one or more insects depending on the blob size.

It can be noted that a large blob detected in step 420 may be a leaf or other foreign matter that became adhered to an insect trap 114. Rather than breaking the blob into a number of insect sized particles, image analytics 308 may apply blob filtering or image recognition to identify the object (e.g., leaf) to filter out or not count the blob. In some cases, machine learning algorithms may be implemented to more accurately filter out foreign matter over time. If a blob is not recognized as an item that should be filtered out, the blob may be considered a congregation of insects to be processed as discussed above.

The method of identifying a number of insects in a horticultural area 102 may further include saving an image of the first object with the number of insects determined to be on the first object, a time stamp, camera information and other information as metadata. For example, as shown in FIG. 5, the number of insects and time stamp may be saved with an image of the first object in a database 530, which may be a portion of an image database stored in data storage 230. This information may be retrievable from database 530. For example, this information may be retrieved from database 530 and sent to a location, such as a smartphone app, a website (e.g., insect count website 216), or a user dashboard, where the user can view the information. For example, the user may view the insect count in association with the first digital image 550 or the cropped image 555.

Further, the insect count determined in association with multiple digital images taken at the same time or in a particular time window may be aggregated to provide a total insect count for a horticultural area. Other metrics may also be provided, such as insects per unit area, increase in insect count over time or other metrics.

Figure 6:
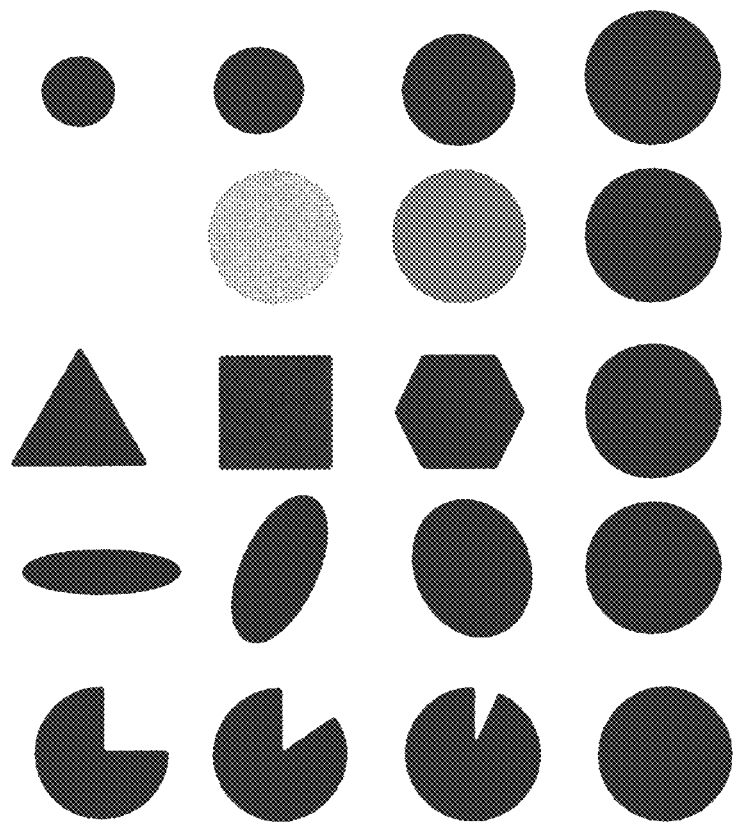
FIG. 6 illustrates a set of generic shapes for parameter range testing.

FIG. 6 illustrates a set of generic shapes for parameter range testing. From top to bottom row, the shapes represent different values area, thresholds, circularity, inertia and convexity. During a configuration phase, various combinations of these parameters can be tested to determine the combination that best identifies various types of insects and the parameters can be stored at server 204 as insect detection parameters for use by image analytics module 308.

Figure 7:
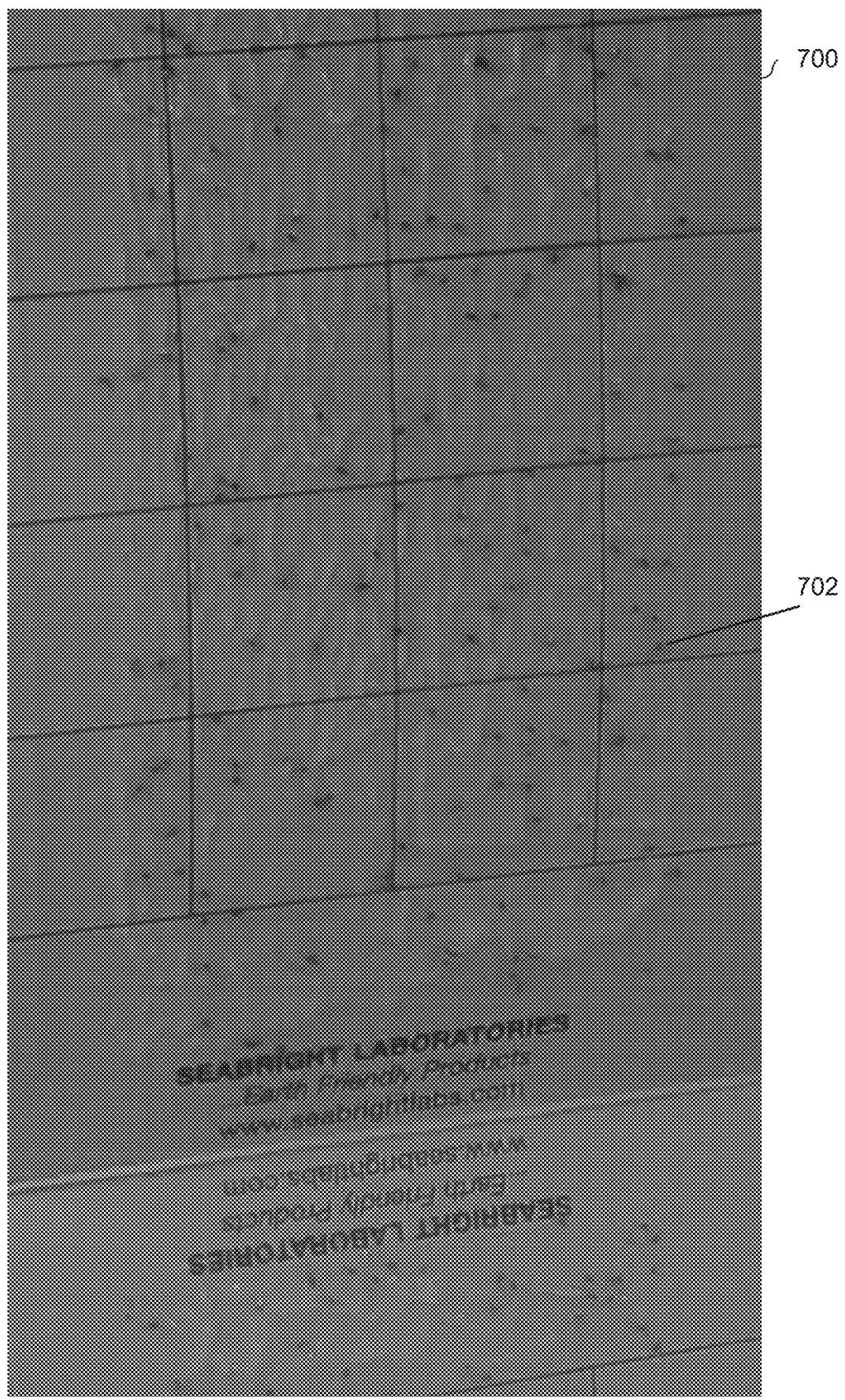
FIG. 7 illustrates a cropped insect trap image for processing.
Figure 8:
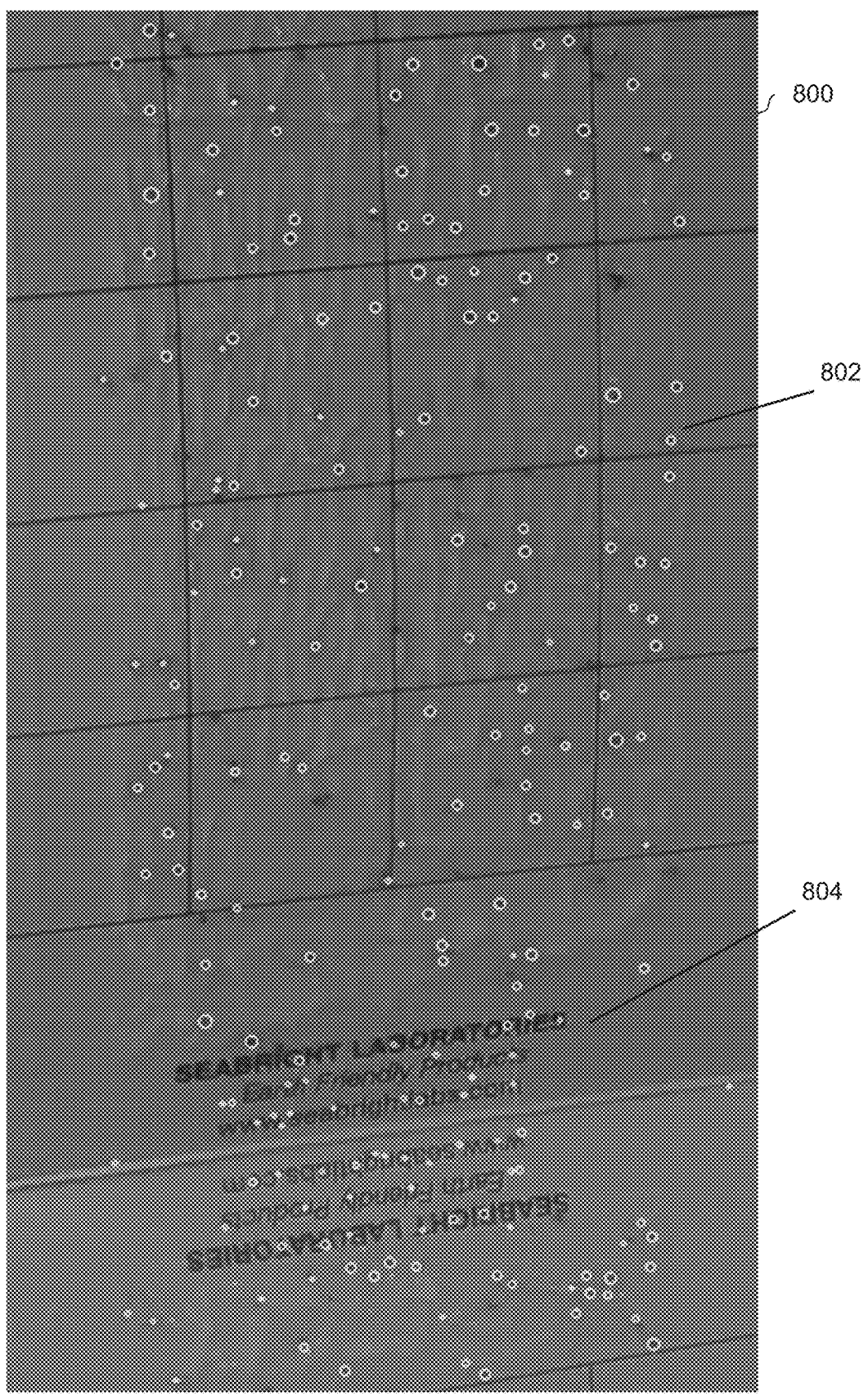
FIG. 8 illustrates the processed image with blobs identified.

FIG. 7 illustrates a cropped insect trap image for processing. For example, FIG. 7 illustrates a dark area 702 in the cropped insect trap image. FIG. 8 illustrates the processed image with blobs identified. For example, FIG. 8 illustrates an identified blob 802 corresponding to the dark area 702 in the cropped insect trap image of FIG. 7. It can be noted that the thresholding, color, shape and size filtering can be further refined (e.g., through empirical testing or machine learning) to further remove false positives. In another embodiment, feature matching, such as keypoint feature matching, can be used to identify known features of a trap, such as lettering, logos, etc. to filter out blobs that occur on those features (e.g., to filter out false positives caused by lettering 804 in FIG. 8). In other embodiments, features that may result in false positives may be removed by cropping or a filtering step (steps 410, 414).

FIGS. 9A and 9B are a flow chart illustrating another example method 900 of identifying a number of insects in a horticultural area according to another embodiment. Embodiments of FIGS. 9A and 9B may be operable to detect traps under multiple spectrums without using spectrum compensation. Steps 906-914 represents one embodiment of a feature recognition that may be applied by a feature recognition module 302. The feature recognition module 302 may search for regions of a specified color. A configuration interface may be provided to allow a user to configure the color for which feature recognition module 302 search. Step 916 represents one embodiment of object recognition that may be performed by an object recognition module 304.

The method of identifying a number of insects in a horticultural area may include obtaining user input of an insect type of interest. In the example embodiment shown in FIG. 9A, at 902, user input of an insect type of interest is obtained. The user input may be obtained a number of different ways, as discussed above with regard to FIG. 4A.

The method of identifying a number of insects in a horticultural area may include obtaining a first digital image of the horticultural area 202. In the example embodiment shown in FIG. 9A, a first digital image of the horticultural area is obtained at step 904. For example, the first digital image may be obtained from a database (e.g., a database associated with server 204), or may be obtained directly from an image sensor (e.g., one or more cameras 203), or any other way of obtained digital images. As discussed above, the first digital image may include at least a portion of at least one insect trap.

At step 906, feature recognition module 302 converts the obtained digital image to a specific color space that makes it easier to identify objects of interest in the image (a trap recognition color space). In particular, the digital image may be converted to a color space in which the pixels corresponding to an insect trap have high values in at least one channel while the pixels corresponding to the background (e.g., plants) do not have high values in that channel. For example, if the first object of interest (e.g., an insect trap) is yellow, a color space for isolating yellow may be selected. According to one embodiment, the image may be converted to the LAB (lightness, green-red, yellow-blue) color space. In the LAB color space, yellow pixels will have high values in the B channel. In some embodiments, the user may be given the option to select the trap color used and the trap recognition color space can depend on the trap color selected. The trap detection color space may be specified in trap detection parameters 928.

Figure 10:
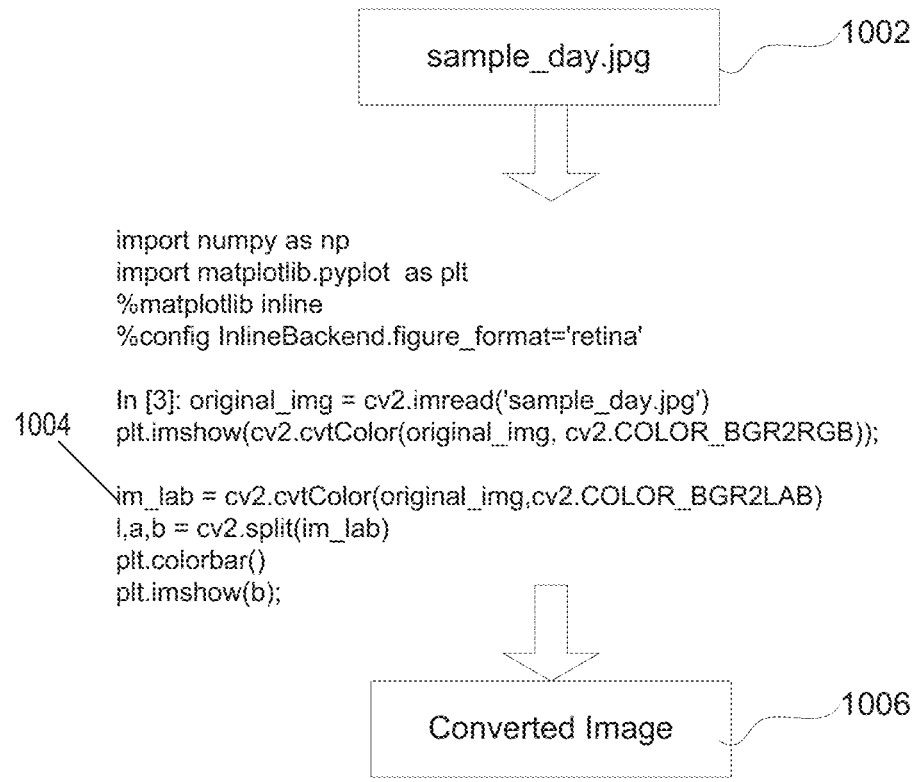
FIG. 10 illustrates an example transformation of an image from a first color scheme to a specified color scheme according to an embodiment.

An example of step 906 being performed is shown in FIG. 10 on a digital image 1002 "sample_day.jpg". As shown in the example embodiment of FIG. 10, code portion 1004 converts the obtained digital image into the LAB color space to produce converted image 1006. In converted image 1006, the pixels corresponding to a yellow insect trap will have high values (e.g., close to 255) for the B channel.

Conditioning steps may be applied to a source image to further separate the pixels corresponding to the insect trap from pixels representing the background (plants and other non-insect trap objects). Example conditioning steps, according to one embodiment, are described below with respect to steps 908-914.

Overlays may be applied to the digital image (e.g., the color converted digital image) to fine-tune channels to lighten light hues and darken dark hues to better distinguish items of interest in the digital image (e.g., by selecting which channels to which to apply overlays). In step 908, a first overlay operation is performed on the resulting digital image of step 906 to condition the digital image. In one embodiment, an overlay layer is determined and then an overlay blend performed using the overlay layer. As would be appreciated by those in the art, an overlay blend is a layer blending technique that can further separate colors (highlight the highs and darken the lows).

In an overlay blend, the base color is not replaced, but mixed with a blend color to reflect the lightness or darkness of the original color. In general, an example result may be determined as:

$$Result = Layer1/255*(I+((2*Layer2)/255)*(255-Layer1))$$

where I is intensity. According to one embodiment, an overlay layer may be determined from the absolute differences between color channels, in order to advantageously increase the differences between the background and the first object of interest (e.g., an insect trap). For example, a layer may be created having the pixel value |−A+B| for each pixel, where |−A+B| is the absolute value of the difference between A and B channels for the respective pixel in the converted digital image 1006. The overlay blend result, for each pixel, may then be reduced to:

$$Result = 255-(((255-|-A+B|)*(255-|-A+B|))/255)$$

After this overlay, a clearer difference between the background and the first object of interest may be seen in the image result. In this case, the resulting overlaid image has a single color channel.

Figure 11:
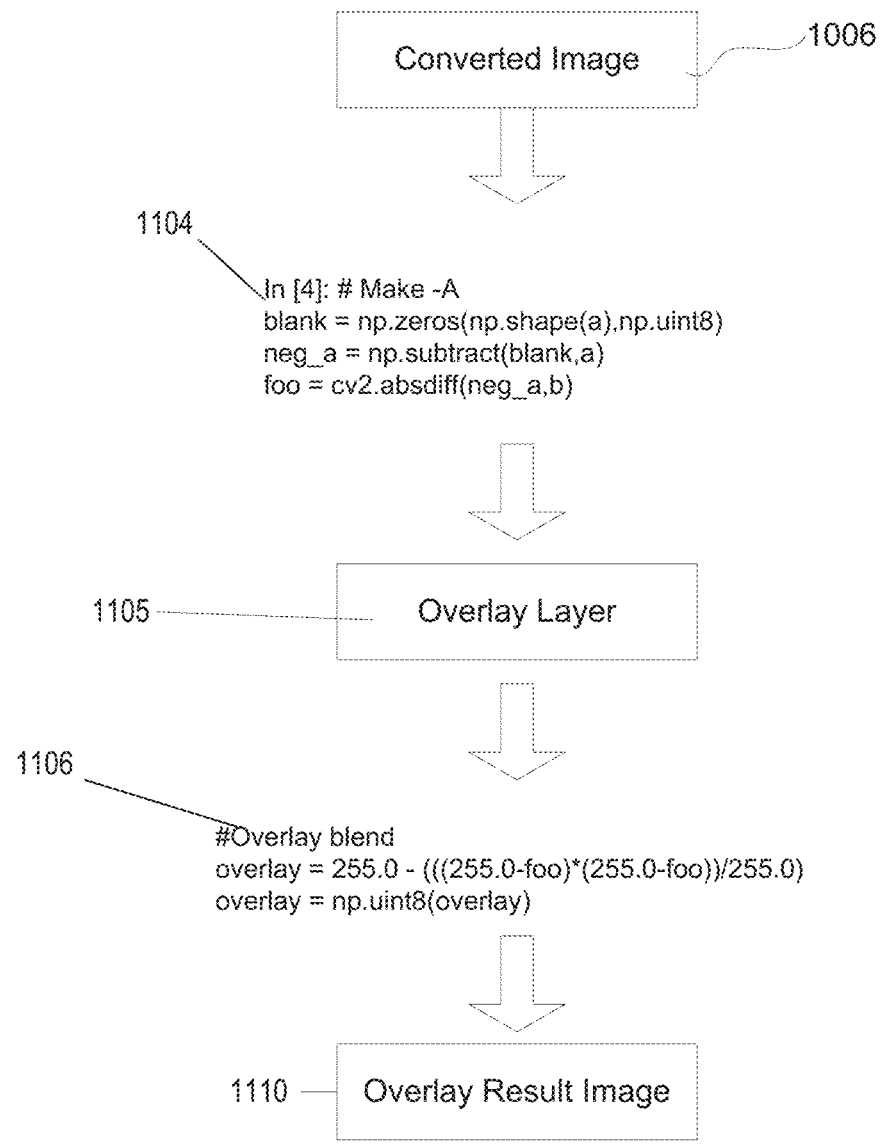
FIG. 11 illustrates an example first overlaying of an image according to an embodiment.

FIG. 11 illustrates one embodiment of step 908. In FIG. 11, code portion 1104 illustrates an example of a technique for determining the absolute value of the difference between the A and B channels in the digital image (i.e., per pixel) to produce an overlay layer 1105. As shown in code portion 1104, a variable "foo" is used as an intermediate variable to store the overlay layer 1105 (for the absolute difference result, which is used in the next step). At code portion 1106, the overlay technique is performed on each pixel of the digital image (e.g., in each pixel of overlay layer 1105) to produce an overlay result image 1110. In FIG. 11, the overlay result image 1110 is stored as a pixel array "overlay." In the overlay result image 1110, pixels corresponding to an insect trap 114, are more distinguishable from the background when compared to digital image 1002 or converted image 1006. In other words, there is more separation in image 1110 in at least one channel between the pixel values for pixels representing the trap and pixel values for pixels representing the plants.

At step 910, feature detection module 302 can apply a binary threshold to the overlay result image 1110 to further condition the digital image. The thresholding may be applied to map pixels below a threshold to 0 and pixels above the threshold to 255. The threshold may be determined for use in separating the background from the first object of interest (e.g., insect trap). The threshold applied may be dependent on the color of the insect trap, the color of the background, the spectrum, the color space in which thresholding is occurring or other factors. The threshold may be static (e.g., the same regardless of the pixel values) or dynamic (dependent on the pixel values).

In one embodiment, the first threshold may be specified in trap detection parameters 928. In another embodiment, the first threshold is dynamic (dependent on pixel values). The parameters to determine the dynamic threshold may be specified in trap detection parameters 928. According to one embodiment of dynamic thresholding, an analysis is performed on the overlay result image (e.g., image 1110) to determine maximal differences among pixel color values. More particularly, in one embodiment, feature recognition module 302 analyzes each line (row) of pixels in the overlay result image 1110 to determine the row-specific difference between the maximum pixel value and minimum pixel color value for each row and selects the largest row-specific difference as the maximal difference for the image. A first threshold of c1*(maximal difference), where "c1" is a coefficient, is applied to threshold the image. The coefficient, c1, to determine the first threshold may be specified in trap detection parameters 928.

Figure 12:
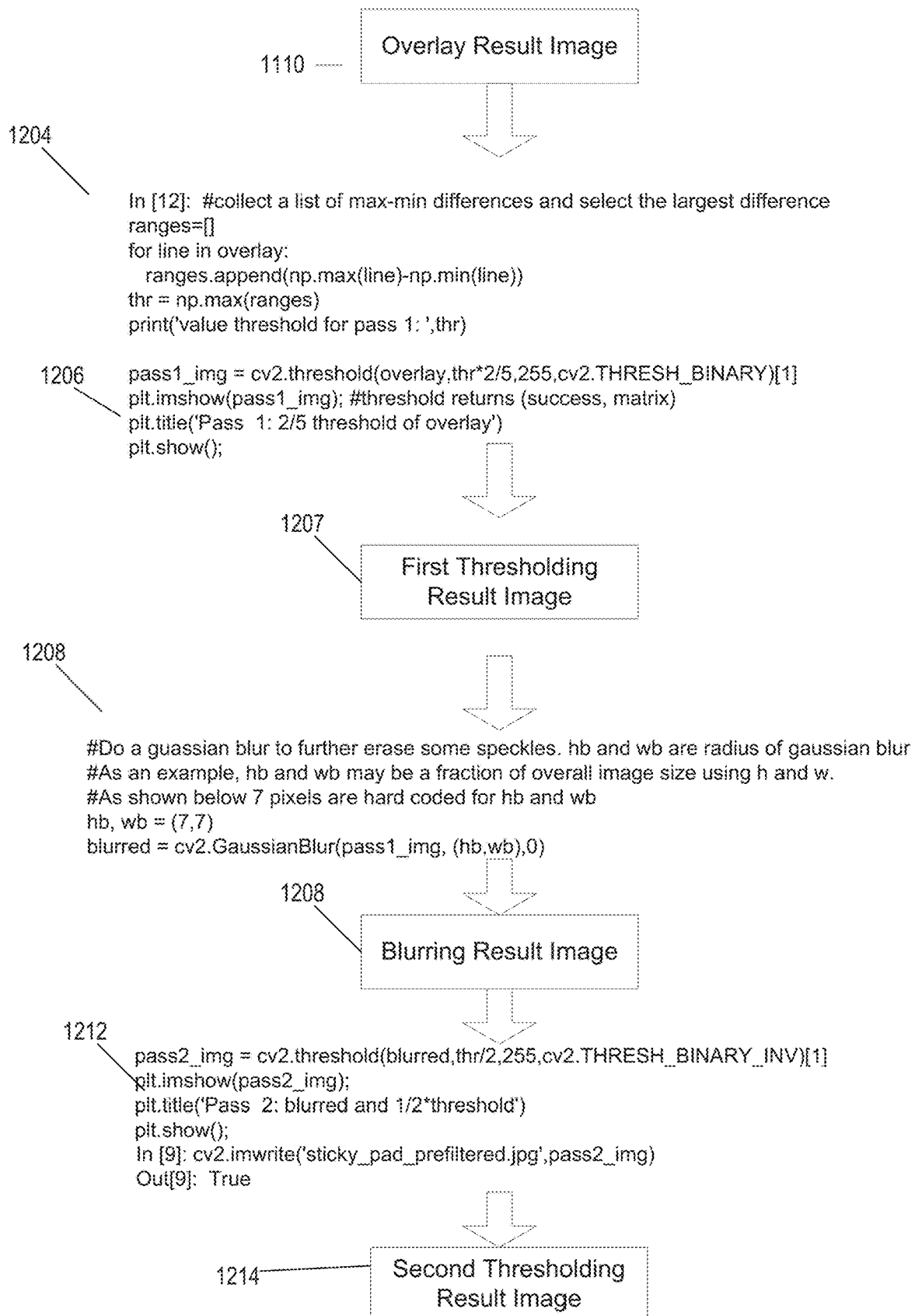
FIG. 12 illustrates example thresholding passes over an image according to an embodiment.

In the embodiment of FIG. 12, an example code portion 1204 analyzes each line in the overlay result image 1110 to determine the range of pixel values. For example, the highest and lowest values of pixels in each respective line of pixels in the image are determined, followed by determining the differences between the highest and lowest values, for each line of pixels. The largest maximum difference is then used to determine a threshold. As shown in the example of FIG. 12, a base threshold (e.g., "thr") is determined as the maximum value among the ranges. The base threshold is used to determine the thresholds applied in subsequent thresholding passes.

A first threshold pass is then performed using the threshold ⅔*thr on the overlay result image 1110 to produce a first thresholding result image 1207. For example, code portion 1206 illustrates an example of performing a first threshold pass over the image 1110. The first thresholding result image 1207 is stored as pass1_img by code portion 1204.

A blur operation is performed at step 912 to further condition the digital image. The blur operation is performed to blur clustered regions in the thresholding result image 1207 (e.g., to despeckle and remove artifacts in the digital image). As shown in FIG. 12, an example code portion 1208 performs a Gaussian blur (e.g., to further erase speckles) to produce a blurring result image 1210. Example inputs to a blur function, which may be specified in trap detection parameters 928, may include a "radius of blur," which for this example are named "hb" and "hw" to denote number of pixels along the x and y axis, respectively, for blurring. The horizontal and vertical inputs can be a function of overall image size, and they can fall within a range of values. The blurring may spread out the center value of a group, with an effect of producing a "soft" image (e.g., erasing other artifacts).

At step 914, a second threshold pass is performed on the blurred image 1208 using a second threshold. In one embodiment, the second threshold may be specified in trap detection parameters 928. In another embodiment, the second threshold is dynamic (dependent on pixel values). Parameters to determine the dynamic threshold may be specified in trap detection parameters 928. According to one embodiment, the second threshold is c2*(maximal difference) where c2 is a coefficient specified in trap detection parameters 928.

Returning to FIG. 12, code portion 1212 illustrates an example of performing a second threshold pass over the blurred image to produce a second thresholding result image 1214. In this example, a threshold of the base threshold value 'thr' is multiplied by a second coefficient (e.g., c2=½ for this example) to produce the second pass threshold (e.g., 0.5*(maximal difference)). In this example, pixels with "small" values (e.g., below a threshold value of "smallness") are set to 255 and other pixels are set to 0. As such, the object of interest will appear as black if image 1214 was rendered. In the example of FIG. 12, the second thresholding result image 1214 is stored as 'sticky_pad_prefiltered.jpg.'

The overlay result image 1110 may thus be filtered through a number of steps such that pixels corresponding to the first object of interest (e.g., insect trap), have a desired pixel value (e.g., 0, 255, or value in a specified range of values). Further, the image is processed to reduce the number of other objects or artifacts that have the desired pixel value(s) corresponding to an insect trap. The result may be used to identify an object of interest in the original digital image.

In the example shown in FIG. 9B, at step 916, the first object in the original first digital image 1002 is isolated using a mask image. The first object of interest (e.g., insect trap) may be isolated based on size and shape (e.g., specified in the trap detection parameters 928). For example, an insect trap may be assumed to be rectangular and relatively large compared to other objects having similar pixel values in the mask. Accordingly, a blob detection can be performed using parameters selected to identify a blob having a shape corresponding to an insect trap. Blobs that are too small or have the wrong shape to be insect traps can be filtered out and any remaining blobs identified as insect traps.

Figure 13A:
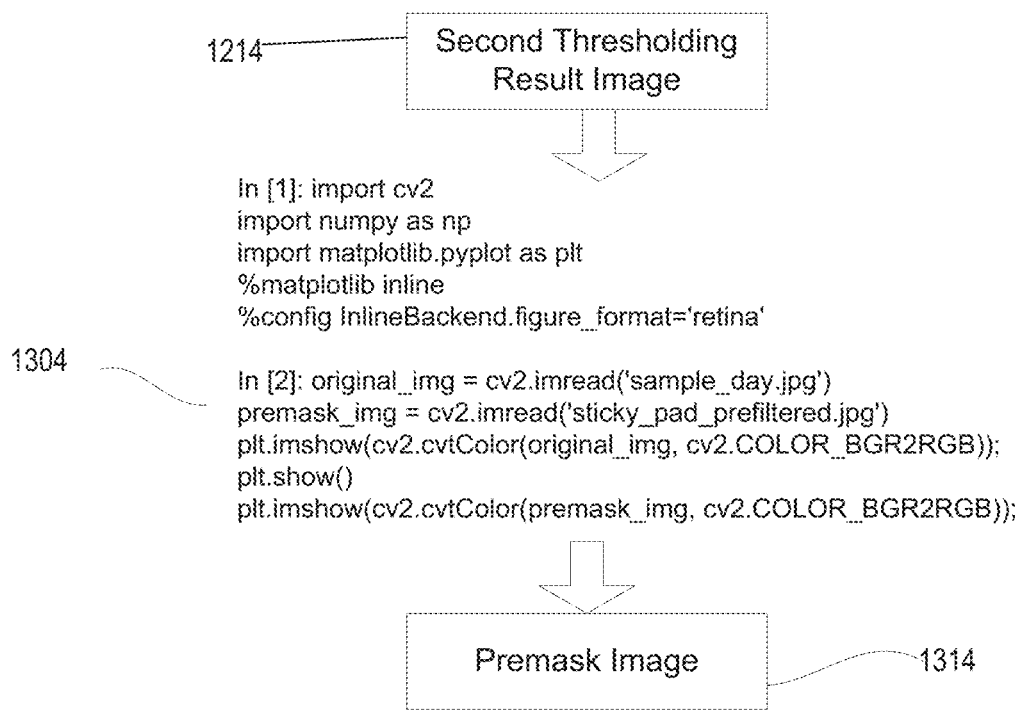
FIG. 13A illustrates an example code portion generating a pre-mask of an image according to an embodiment and FIG. 13B illustrates one example of an original image and premask image.
Figure 13B:
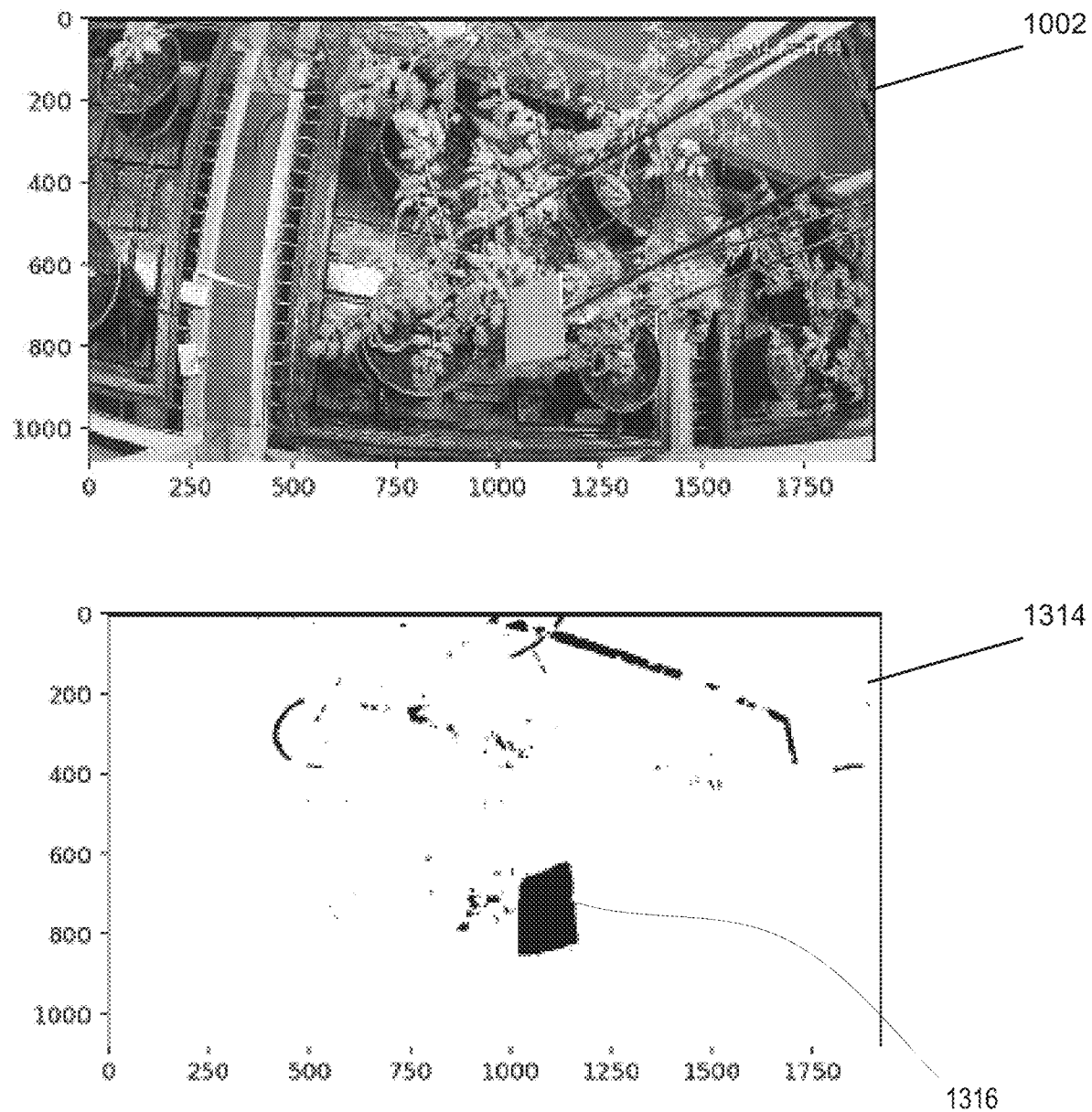

Turning to the example embodiment of FIG. 13A, code portion 1304 loads the original image 1002 and conditioned digital image (e.g., second thresholding result image 1214) in the same color space (e.g., RGB) and sets the second thresholding result image 1214 as a premask image (premask_img) 1314 for use in subsequent operations. FIG. 13B illustrates one embodiment example an original image 1002 and a mask image 1314. As shown in FIG. 13B, the pixels in area 1316, which corresponds to the insect trap, have a high contrast with the background.

Figure 14B:
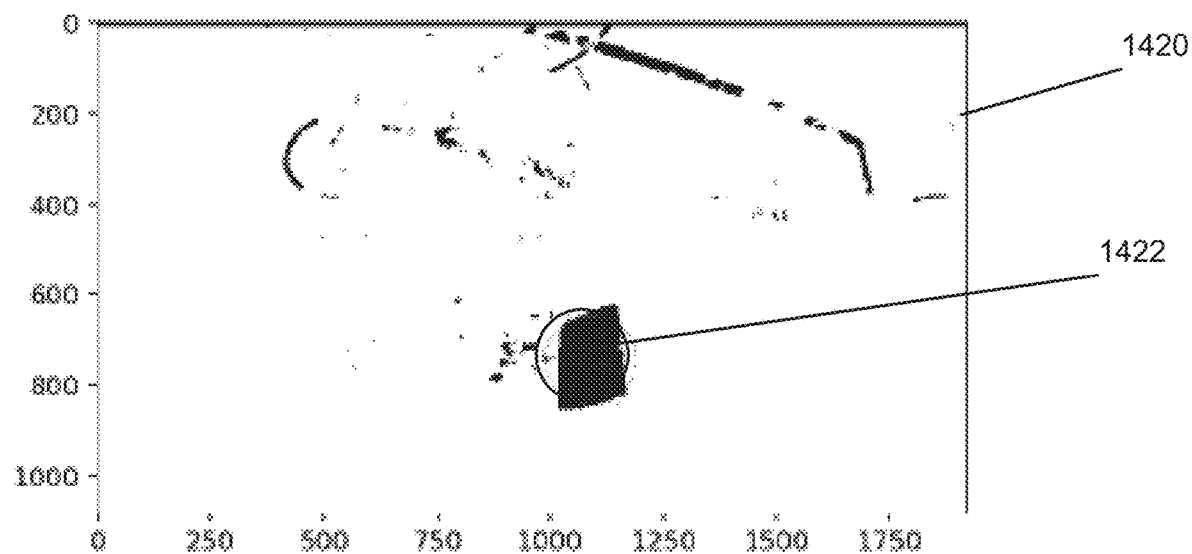

Blob detection may be performed on the mask image (in this case premask image 1314). As shown in the embodiment of FIG. 14A, an example code portion 1406 detects blobs by filtering for various types of shape attributes, which may be specified in the trap detection parameters 430. For example, an insect pad may have high inertia, high convexity, and a larger cluster of pixels than other items in the original digital image (e.g., a "larger" blob). Thus object detection module 304 may configured, via trap detection parameters 928, with inertia, convexity, and cluster of pixels as inputs for a blob detector. As shown in the example of FIG. 14A, code portion 1406 filters by area, circularity, convexity, and inertia. A result of this processing is a returned set of items matching the criteria. Thus, the insect trap may be isolated via a characterization of blobs, in this example. FIG. 14B depicts the image result 1420 of the first blob detection (to detect insect traps), with insect trap 1422 circled (e.g., circled around the centroid of the blob identified as the insect trap 1422).

Turning to the embodiment of FIG. 15, if a trap is detected, a flood fill operation is performed to flood fill the blob identified as an (insect trap) with a specified color and then set other pixels to 0. A flood fill fills a connected component starting from a seed point with the specified color. The connectivity is determined by the color/brightness closeness of the neighbor pixels. The pixel at (x, y) is considered to belong to the repainted domain (to the connected component) if:

$$src(x',y')-loDiff \le src(x,y) \le src(x',y')+upDiff$$

loDiff is the maxial lower brightness/color difference between the currently observed pixel in an image and one of its neighbors belonging to the component, or a seed pixel being added to the component. upDiff is the maximal upper brightness/color difference between the currently observed pixel and one of its neighbors belonging to the component, or a seed pixel being added to the component.

In one embodiment the flood fill operation may be performed using the floodFill function of the OpenCV library (indicated at 1508). Example code portion 1510 illustrates flood fill operations for isolating the first object of interest (e.g., the insect trap) in the insect trap using the OpenCV floodFill image transformation. In the example of FIG. 15, the premask image 1314 is used as the image input for the floodFill function (as illustrated by line 1511). The OpenCV floodFill function expects the operation mask to be two pixels wider and two pixels taller than the image. The operation mask for the flood fill is set at line 1511. The seed point is set, at line 1514, to the center of the blob identified as a trap (e.g., in FIG. 14A). At line 1516, the newVal is set so that pixels of the connected component will be flood filled with the value (255, 0, 0) in the RGB color space.

Various other example operation parameters are set. For example, operation flags are set at portion 1516. The first 8 bits contain a connectivity value. A default value of 4 means that only the four nearest neighbor pixels (those that share an edge) are considered. A connectivity value of 8 means that the eight nearest neighbor pixels (those that share a corner) will be considered. The next 8 bits (8-16) contain a value between 1 and 255 with which to fill the mask (the default value is 1). For example, 4|(255<<8) will consider 4 nearest neighbors and fill the mask with a value of 255. FLOODFILL_MASK_ONLY—when set, the function does not change the image (newVal is ignored), and only fills the mask with the value specified in bits 8-16 of flags as described above.

An example of a resulting output mask image 1520, with isolated insect trap, is illustrated. In this case, pixels corresponding to the insect trap have been filled white and other pixels have be transformed to or remain black. Because black pixels from premask image 1314 that correspond to other artifacts than the insect trap are not part of a connected component with the seed point, they are not flood filled and remain black. Thus, the flood fill operation effectively filters out any additional artifacts that remain in the premask image 1314 when creating mask image 1520.

Figure 16A:
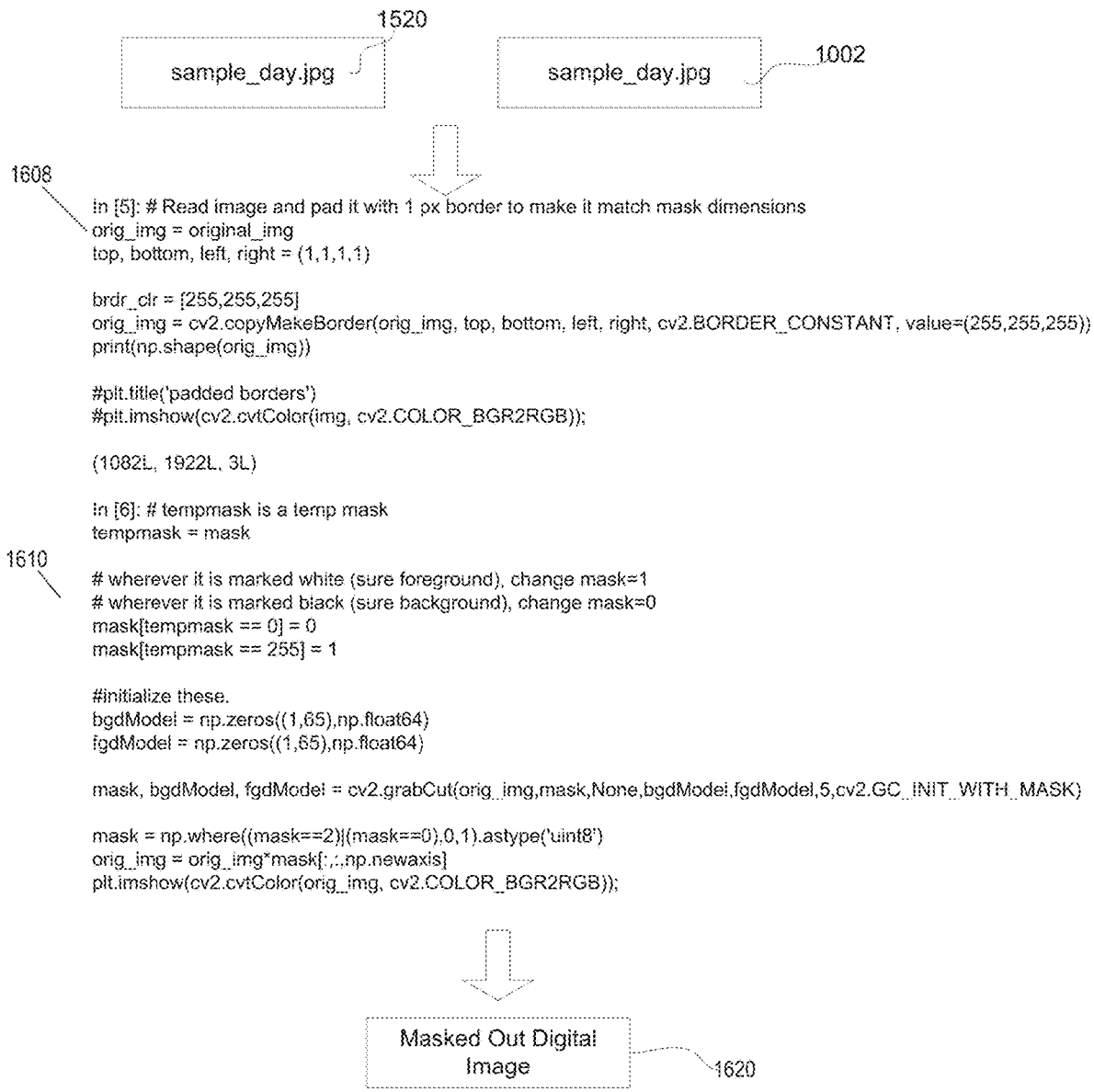
FIG. 16A illustrates an example mask technique according to an embodiment and FIG. 16B is an example of a masked out digital image.

Turning to FIG. 16A, the system (e.g., object recognition module 304) may perform an additional masking to isolate the insect trap in the original image. For example, the mask image 1520 generated above may be used on the original digital image 1002 to black out everything that does not correspond to the blob identified as a trap to create a masked out digital image 1620.

Figure 16B:
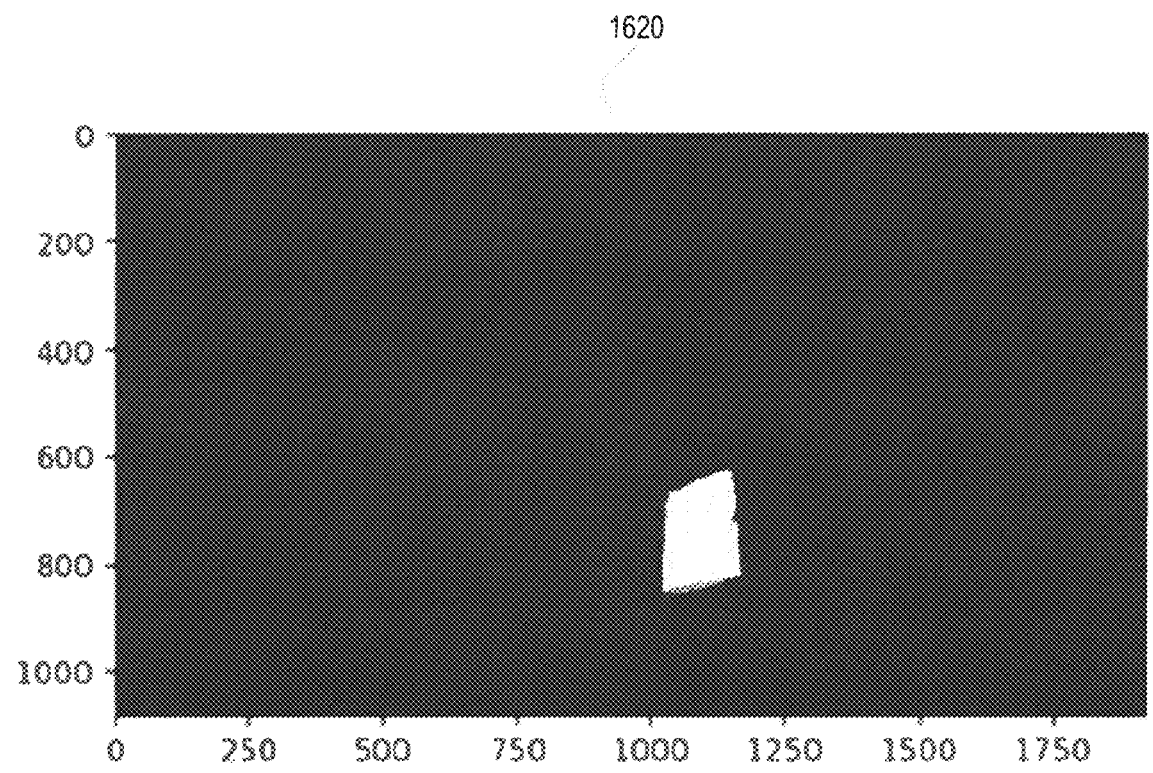

In the embodiment of FIG. 16A, image generator 306 isolates the identified insect trap. According to one embodiment, the OpenCV grabcut function is used to isolate the trap. It is noted that, since the mask 1520 that has been created according to an embodiment that used the OpenCV floodFill is 1 pixel larger all around than the original image, the original image may be padded before doing the grabcut function. In other words, the original image can be padded to have the same shape (e.g., same dimensions) as the mask 1520. In FIG. 16A, an example code portion 1608 illustrates obtaining the original digital image and padding it with a 1 pixel border to match the dimensions of the mask 1520 generated above. An example code portion 1610 transforms all portions of a temporary mask to 0 or 1, depending on whether the temporary mask has a value of 0 or 255. The result is used to black out (in the original digital image) all that has not been determined to be in the trap discussed above. The original digital image is modified so that pixels that do not correspond to the identified trap are black. The pixels that correspond to the identified trap, however, can retain their original values. Thus, for example, features of the trap (such as gridlines) and insects are still visible in masked out digital image 1620, an example of which is illustrated in FIG. 16B.

Returning to FIG. 9B, the method of identifying a number of insects in a horticultural area may include performing particle analysis on the source image in the desired color space to identify particles based on the insect detection parameters 930, which may correspond to a user-specified insect type of interest. In some embodiments, this step may be accomplished by image analytics module 308 of image processing module 226. In the example shown in FIG. 9B, at 918, particle analysis is performed on a source image, such as the masked out digital image 1620 as discussed above, to identify particles based on the user-specified insect type of interest. Step 918 may be performed a number of different ways. For example, in the case where the pixels corresponding to insects were determined as blobs on the insect trap, the particle analysis may include performing color recognition to search the source image for regions of pixels in particular range of values that pass filter criteria (e.g., greater than or equal to a predefined size, have particular shape characteristics or other features corresponding to the selected insect).

The method of identifying a number of insects in a horticultural area may include deciding whether one or more particles are multiple insects clumped together. In the example shown in FIG. 9B, at 920, a decision is made as to whether there is a relatively large particle identified (e.g., a threshold size greater than the defined insect size). Accordingly, in an embodiment in which a white fly is the insect type of interest, a decision is made as to whether a size of an identified particle is x times greater than the predefined size of a white fly. Similarly, in an embodiment in which a thrip is the insect type of interest, a decision is made as to whether a size of the identified particle is x times greater than the predefined size of a thrip.

In response to deciding that an identified particle is a threshold size larger than the defined size of the user-specified insect type of interest, the particle can be broken down into a number of insects (step 922). This determination can be accomplished, for example, by dividing the size (e.g., surface area) of the particle determined to be larger than the size (e.g., surface area) of the user-specified insect type of interest by the size of the user-specified insect type of interest (e.g., particle size/insect size). Once the number of insects in the particle that is larger than the size of the user-specified insect type of interest is known, this number can be added to the number of insects determined in step 924. If a particle size is not greater than a threshold size as determined at step 920, the particle can be considered a single insect. The identified particle can be added to the number of the insects on the first object.

Accordingly, at 924, the number of insects on the first object can include adding up the number of identified particles considered to be a single insect, as well as adding in the numbers of insects determined in step 922. The number of insects determined to be included on the first object may be used to estimate the number of insects in the horticultural area 102.

If no particles are identified when the particle analysis is performed on the image, then the next step may include returning to the step of obtaining a first digital image of the horticultural area 102. This way, one or more of steps 902, 904, 906, 908, 910, 912, 914, and 916 may be repeated to determine whether any insects have shown up on the insect trap. Even if insects are detected on the insect traps, the steps of the method may be repeated at certain predetermined intervals to monitor any increase in insect presence.

It can be noted that a large blob detected in step 920 may be a leaf or other foreign matter that became adhered to an insect trap 114, 116. Rather than breaking the blob into a number of insect sized particles, image analytics 308 may apply blob filtering or image recognition to identify the object (e.g., leaf) to filter out or not count the blob. In some cases, machine learning algorithms may be implemented to more accurately filter out foreign matter over time. If a blob is not recognized as an item that should be filtered out, the blob may be considered a congregation of insects to be processed as discussed above. Each blob remaining after blob filtering may be counted as one or more insects depending on the blob size.

One example of analyzing an image to determine a number of insects is illustrated in FIGS. 17A-17B. In the embodiment of FIGS. 17A-17B, an insect blob detect is performed on the masked out original digital image 1620. Parameters of the blob detect may be hardcoded, or parameters may be optimized to be a function of image size and intensity of a pixel set of a trap. For this example, the isolated insect trap is analyzed to detect "small" objects as blobs (e.g., as opposed to detecting larger objects as insect trap blobs). For example, an analysis may look for low inertia objects on the insect trap.

In FIG. 17A, an example code portion 1704 sets up the parameters for the insect blob detect function. In FIG. 17B, an example code portion 1720 performs a blob detect on the masked original digital image to detect small blobs (e.g., assumed to be insects on the insect trap). In one embodiment, the parameters may be selected from a parameter library based on an insect selected by the user.

In FIG. 17B, an example code portion 1722 draws detected blobs as red circles and outputs a count of the detected blobs as the "insect count", as well as an image with and insect trap showing detected insect blobs.

As discussed above, the number of insects may be used to determine whether the plants in the horticultural area 102 need to be treated with insect repellent. For example, a certain predetermined threshold value may be set to determine whether treatment is needed. The threshold may be determined based on a variety of factors. For example, the threshold may be determined based on the sensitivity of the plants to the insects, the cost of the repellent, and/or the amount of time left until harvesting. In some cases, the number of insects may be below the threshold where the insects do not negatively affect the plants. In such cases, it may be determined that no insect treatment is needed. In other cases, the number of insects may be above the threshold. In such cases, it may be determined that insect treatment is needed. In yet other cases, rather than focusing on a threshold, a predetermined increase of insects over a predetermined period of time may be used to determine whether insect treatment needed.

A plant monitoring system described herein may also provide a system and processes for monitoring plant growth as described in U.S. Provisional Application No. 62/532,847, entitled "System and Method for measuring the Growth of Plants in a Horticultural Area," filed Jul. 14, 2017, which is hereby fully incorporated herein by reference for all purposes, and counting buds as described in U.S. Provisional Application No. 62/532,806, entitled "System and Method for Identifying a Number of Buds in a Horticultural Area," filed Jul. 14, 2017, which is hereby fully incorporated herein by reference for all purposes.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system comprising:
 a digital camera;
 a device processor;
 a data store storing trap detection parameters selected to identify pixels corresponding to insect traps and insect detection parameters selected to detect pixels corresponding to insects, the insect detection parameters including an insect recognition color and filter criteria; and a non-transitory computer readable medium storing instructions executable by the device processor to:

capture, using the digital camera, a first digital image of an insect trap against a background of a horticultural area containing the insect trap;

isolate a portion of the first digital image using the trap detection parameters to isolate the insect trap from the background in the first digital image, the portion of the first digital image being the portion of the first digital image representing the insect trap, wherein isolating the portion of the first digital image comprises:

converting the first digital image to a specified color space to create a converted digital image;

performing a conditioning on the converted digital image to produce a conditioned digital image in which pixels representing the insect trap are further separated from pixels representing the background than in the first digital image wherein performing the conditioning on the converted digital image to produce the conditioned digital image comprises:

performing a first overlay operation on the converted digital image to produce a first overlaid image;

performing an analysis on the first overlaid image to determine a maximal difference among pixel color values for the first overlaid image;

performing a first threshold pass on the first overlaid image to produce a first thresholding result image, wherein the first threshold pass applies a first threshold that is dependent on the maximal difference among pixel color values for the first overlaid image;

performing a blur operation to blur clustered regions in the first thresholding result image to produce a blurring result image; and performing a second threshold pass on the blurring result image to produce a second thresholding result image, wherein the second threshold pass applies a second threshold that is dependent on the maximal difference among pixel color values for the first overlaid image;

performing an object detection to detect the insect trap in the conditioned digital image;

performing a first isolating operation on the conditioned digital image to produce an image mask; and performing a second isolating operation on the first digital image using the image mask to isolate the portion of the first digital image as an isolated portion;

perform automated particle detection on the isolated portion of the first digital image according to the insect detection parameters to identify regions of pixels in the isolated portion of the first digital image that have the insect recognition color and that pass the filter criteria;

determine a cardinality of insects on the insect trap based on a number of identified regions of pixels;

store the cardinality of insects in association with the first digital image; and provide the cardinality of insects for display in a graphical user interface.

2. The system of claim 1, wherein the conditioning comprises a binary threshold pass to map pixels above a threshold to a value of 255 and pixels below the threshold to 0.

3. The system of claim 1, wherein the conditioning comprises a binary threshold pass to map pixels above a threshold to a value of 0 and pixels below the threshold to 255.

4. The system of claim 1, wherein performing analysis on the first overlaid image to determine the maximal difference among pixel color values for the first overlaid image comprises:

determining a row-specific difference between maximal and minimal values of pixels in respective rows of pixels in the first overlaid image; and selecting a greatest row-specific difference as the maximal difference among pixel color values for the first overlaid image.

5. The system of claim 1, wherein performing the first overlay operation on the converted digital image comprises determining, for each pixel in the converted digital image, an absolute value of a difference between two channels of the specified color space.

6. The system of claim 1, wherein the conditioned digital image is the second thresholding result image.

7. The system of claim 1, wherein the specified color space is a lightness, red-green, yellow-blue (LAB) color space.

8. The system of claim 1, wherein the insect detection parameters used in the particle detection are based on a user-identified insect type of interest to a user.

9. The system of claim 1, wherein performing particle detection on the isolated portion of the first digital image according to the insect detection parameters to identify regions of pixels in the isolated portion of the first digital image that pass the filter criteria comprises converting the isolated portion of the first digital image to an insect detection color space.

10. The system of claim 9, wherein the insect detection color space is grayscale.

11. A computer program product comprising a non-transitory computer readable medium storing instructions executable by a device processor to:

capture, using a digital camera, a first digital image of an insect trap against a background of a horticultural area containing the insect trap;

isolate a portion of the first digital image using trap detection parameters to isolate the insect trap from the background, the portion of the first digital image being the portion of the first digital image representing the insect trap, wherein isolating the portion of the first digital image comprises:

converting the first digital image to a specified color space to create a converted digital image;

performing a conditioning on the converted digital image to produce a conditioned digital image in which pixels representing the insect trap are further separated from pixels representing the background than in the first digital image wherein performing the conditioning on the converted digital image to produce the conditioned digital image comprises:

performing a first overlay operation on the converted digital image to produce a first overlaid image;

performing an analysis on the first overlaid image to determine a maximal difference among pixel color values for the first overlaid image;

performing a first threshold pass on the first overlaid image to produce a first thresholding result image, wherein the first threshold pass applies a first threshold that is dependent on the maximal difference among pixel color values for the first overlaid image;

performing a blur operation to blur clustered regions in the first thresholding result image to produce a blurring result image; and performing a second threshold pass on the blurring result image to produce a second thresholding result image, wherein the second threshold pass applies a second threshold that is dependent on the maximal difference among pixel color values for the first overlaid image;

performing an object detection to detect the insect trap in the conditioned digital image;

performing a first isolating operation on the conditioned digital image to produce an image mask; and performing a second isolating operation on the first digital image using the image mask to isolate the portion of the first digital image as an isolated portion;

perform automated particle detection on the isolated portion of the first digital image according to insect detection parameters to identify regions of pixels in the isolated portion of the first digital image that have an insect recognition color and that pass filter criteria;

determine a cardinality of insects on the insect trap based on a number of identified regions of pixels;

store the cardinality of insects in association with the first digital image; and provide the cardinality of insects for display in a graphical user interface.

12. The computer program product of claim 11, wherein the conditioning comprises a binary threshold pass to map pixels above a threshold to a value of 255 and pixels below the threshold to 0.

13. The computer program product of claim 11, wherein the conditioning comprises a binary threshold pass to map pixels above a threshold to a value of 0 and pixels below the threshold to 255.

14. The computer program product of claim 11, wherein performing analysis on the first overlaid image to determine the maximal difference among pixel color values for the first overlaid image comprises:
    determining a row-specific difference between maximal and minimal values of pixels in respective rows of pixels in the first overlaid image; and
    selecting a greatest row-specific difference as the maximal difference among pixel color values for the first overlaid image.

15. The computer program product of claim 11, wherein performing the first overlay operation on the converted digital image comprises determining, for each pixel in the converted digital image, an absolute value of a difference between two channels of the specified color space.

16. The computer program product of claim 11, wherein the conditioned digital image is the second thresholding result image.

17. The computer program product of claim 11, wherein the specified color space is a lightness, red-green, yellow-blue (LAB) color space.

18. The computer program product of claim 11, wherein the insect detection parameters used in the particle detection are based on a user-identified insect type of interest to a user.

19. The computer program product of claim 11, wherein performing particle detection on the isolated portion of the first digital image according to the insect detection parameters to identify regions of pixels in the isolated portion of the first digital image that pass the filter criteria comprises converting the isolated portion of the first digital image to an insect detection color space.

20. The computer program product of claim 19, wherein the insect detection color space is grayscale.

* * * * *